United States Patent
Sakai et al.

(10) Patent No.: US 7,068,407 B2
(45) Date of Patent: Jun. 27, 2006

(54) OPTICAL ELEMENT, OPTICAL SCANNER AND IMAGE FORMING APPARATUS

(75) Inventors: Kohji Sakai, Tokyo (JP); Seizo Suzuki, Kanagawa (JP); Hiromichi Atsuumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/273,297

(22) Filed: Nov. 15, 2005

(65) Prior Publication Data

US 2006/0077501 A1   Apr. 13, 2006

Related U.S. Application Data

(62) Division of application No. 10/438,065, filed on May 15, 2003.

(30) Foreign Application Priority Data

May 22, 2002   (JP) ............................. 2002-147934

(51) Int. Cl.
   *G02B 26/08* (2006.01)

(52) U.S. Cl. ..................................... 359/205

(58) Field of Classification Search ........ 359/204–206, 359/652; 347/244, 259
See application file for complete search history.

(56) References Cited

U.S. PATENT DOCUMENTS

| | | | |
|---|---|---|---|
| 5,221,996 A | 6/1993 | Kikuchi | |
| 6,198,562 B1 * | 3/2001 | Hayashi et al. | ............. 359/204 |
| 6,388,792 B1 | 5/2002 | Atsuumi et al. | |
| 6,400,391 B1 | 6/2002 | Suhara et al. | |
| 6,417,509 B1 | 7/2002 | Atsuumi et al. | |
| 6,448,998 B1 | 9/2002 | Suzuki et al. | |
| 6,509,995 B1 | 1/2003 | Suzuki et al. | |
| 6,596,985 B1 | 7/2003 | Sakai et al. | |
| 2002/0080428 A1 | 6/2002 | Suzuki et al. | |
| 2002/0101642 A1 | 8/2002 | Masuda | |

FOREIGN PATENT DOCUMENTS

| | | |
|---|---|---|
| JP | 9-49976 | 2/1987 |
| JP | 10-288749 | 10/1998 |
| JP | 11-2768 | 1/1999 |
| JP | 11-38314 | 2/1999 |
| JP | 11-44641 | 2/1999 |

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

An optical element can effectively correct misalignment of focused positions of optical spots and an optical spot pitch deviation with respect to image heights due to a refractive index distribution therein. The optical element includes a lens, which serves as an optical system in an optical scanner, is shaped in such a profile that misalignment of a focused position of the optical spot due to the refractive index distribution is corrected for image heights.

18 Claims, 42 Drawing Sheets

FIG.1A PRIOR ART
FIG.1B PRIOR ART
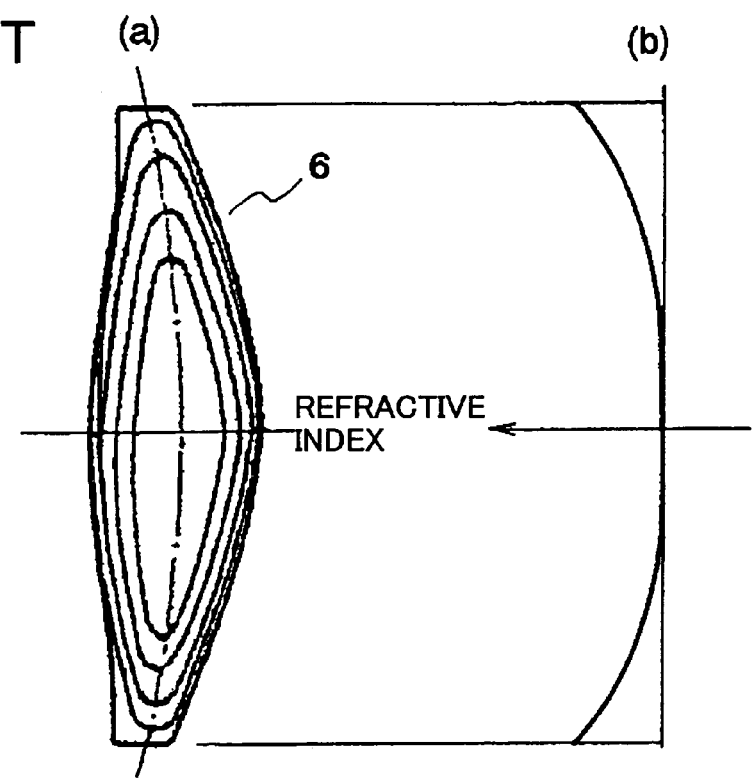
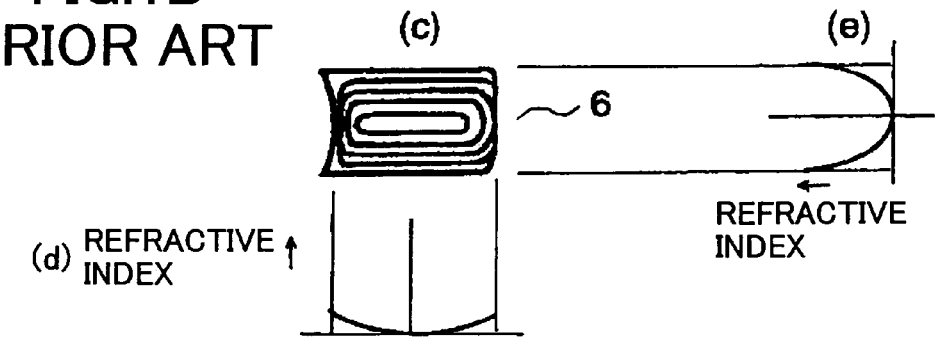

FIG.5

| SURFACE NUMBER | MAIN SCANNING DIRECTIONAL COEFFICIENT | | SUBSCANNING DIRECTIONAL COEFFICIENT | |
|---|---|---|---|---|
| 1 | $R_m$ | 160.425 | $R_s$ | $-91.225$ |
| | $K$ | $-59.969$ | $B_1$ | $5.376 \times 10^{-6}$ |
| | $A_1$ | 0 | $B_2$ | $-3.497 \times 10^{-7}$ |
| | $A_2$ | 0 | $B_3$ | $3.685 \times 10^{-9}$ |
| | $A_3$ | 0 | $B_4$ | $4.747 \times 10^{-10}$ |
| | $A_4$ | $-9.465 \times 10^{-7}$ | $B_5$ | $-5.028 \times 10^{-11}$ |
| | $A_5$ | 0 | $B_6$ | $-7.187 \times 10^{-13}$ |
| | $A_6$ | $3.847 \times 10^{-10}$ | $B_7$ | $2.711 \times 10^{-14}$ |
| | $A_7$ | 0 | $B_8$ | $1.579 \times 10^{-18}$ |
| | $A_8$ | $-8.113 \times 10^{-14}$ | $B_9$ | $-3.704 \times 10^{-18}$ |
| | $A_9$ | 0 | $B_{10}$ | 0 |
| | $A_{10}$ | $1.000 \times 10^{17}$ | $B_{11}$ | 0 |

FIG.6

| SURFACE NUMBER | MAIN SCANNING DIRECTIONAL COEFFICIENT | | SUBSCANNING DIRECTIONAL COEFFICIENT | |
|---|---|---|---|---|
| 2 | $R_m$ | −141.267 | $R_s$ | −15.192 |
| | K | 4.693 | $B_1$ | $5.127 \times 10^{-6}$ |
| | $A_1$ | 0 | $B_2$ | $6.918 \times 10^{-6}$ |
| | $A_2$ | 0 | $B_3$ | $-2.455 \times 10^{-8}$ |
| | $A_3$ | 0 | $B_4$ | $-9.291 \times 10^{-9}$ |
| | $A_4$ | $-1.015 \times 10^{-6}$ | $B_5$ | $1.345 \times 10^{-11}$ |
| | $A_5$ | 0 | $B_6$ | $3.417 \times 10^{-12}$ |
| | $A_6$ | $2.438 \times 10^{-10}$ | $B_7$ | $-1.471 \times 10^{-14}$ |
| | $A_7$ | 0 | $B_8$ | $-9.839 \times 10^{-16}$ |
| | $A_8$ | $-7.856 \times 10^{-14}$ | $B_9$ | $2.073 \times 10^{-18}$ |
| | $A_9$ | 0 | $B_{10}$ | 0 |
| | $A_{10}$ | $2.797 \times 10^{-17}$ | $B_{11}$ | 0 |

FIG.7

| LENS 6 | REFRACTIVE INDEX DISTRIBUTION COEFFICIENT | |
|---|---|---|
| | $n_0$ | 1.52441 |
| | $c_0$ | $1.25 \times 10^{-5}$ |

FIG.8

| SURFACE NUMBER | MAIN SCANNING DIRECTIONAL COEFFICIENT | | SUBSCANNING DIRECTIONAL COEFFICIENT | |
|---|---|---|---|---|
| 1 | $R_m$ | 160.425 | $R_s$ | $-91.155$ |
| | K | $-59.969$ | $B_1$ | $5.397 \times 10^{-6}$ |
| | $A_1$ | 0 | $B_2$ | $-3.704 \times 10^{-7}$ |
| | $A_2$ | 0 | $B_3$ | $3.364 \times 10^{-9}$ |
| | $A_3$ | 0 | $B_4$ | $4.530 \times 10^{-10}$ |
| | $A_4$ | $-9.465 \times 10^{-7}$ | $B_5$ | $-5.031 \times 10^{-11}$ |
| | $A_5$ | 0 | $B_6$ | $-6.840 \times 10^{-13}$ |
| | $A_6$ | $3.847 \times 10^{-10}$ | $B_7$ | $2.756 \times 10^{-14}$ |
| | $A_7$ | 0 | $B_8$ | $1.913 \times 10^{-18}$ |
| | $A_8$ | $-8.113 \times 10^{-14}$ | $B_9$ | $-5.593 \times 10^{-18}$ |
| | $A_9$ | 0 | $B_{10}$ | 0 |
| | $A_{10}$ | $1.000 \times 10^{-17}$ | $B_{11}$ | 0 |

FIG.9

| SURFACE NUMBER | MAIN SCANNING DIRECTIONAL COEFFICIENT | | SUBSCANNING DIRECTIONAL COEFFICIENT | |
|---|---|---|---|---|
| 2 | $R_m$ | −141.267 | $R_s$ | −15.193 |
| | K | 4.693 | $B_1$ | $5.086 \times 10^{-6}$ |
| | $A_1$ | 0 | $B_2$ | $6.937 \times 10^{-6}$ |
| | $A_2$ | 0 | $B_3$ | $-2.482 \times 10^{-8}$ |
| | $A_3$ | 0 | $B_4$ | $-9.290 \times 10^{-9}$ |
| | $A_4$ | $-1.015 \times 10^{-6}$ | $B_5$ | $1.478 \times 10^{-11}$ |
| | $A_5$ | 0 | $B_6$ | $3.459 \times 10^{-12}$ |
| | $A_6$ | $2.438 \times 10^{-10}$ | $B_7$ | $-1.508 \times 10^{-14}$ |
| | $A_7$ | 0 | $B_8$ | $-9.740 \times 10^{-16}$ |
| | $A_8$ | $-7.856 \times 10^{-14}$ | $B_9$ | $8.473 \times 10^{-19}$ |
| | $A_9$ | 0 | $B_{10}$ | 0 |
| | $A_{10}$ | $2.797 \times 10^{-17}$ | $B_{11}$ | 0 |

| SURFACE NUMBER | MAIN SCANNING DIRECTIONAL COEFFICIENT | | SUBSCANNING DIRECTIONAL COEFFICIENT | |
|---|---|---|---|---|
| 1 | $R_m$ | 1616.426 | $R_s$ | −50.145 |
| | K | $1.976 \times 10^{+2}$ | $B_1$ | $-1.162 \times 10^{-5}$ |
| | $A_1$ | 0 | $B_2$ | $2.276 \times 10^{-6}$ |
| | $A_2$ | 0 | $B_3$ | $2.714 \times 10^{-9}$ |
| | $A_3$ | 0 | $B_4$ | $-1.544 \times 10^{-10}$ |
| | $A_4$ | $1.281 \times 10^{-8}$ | $B_5$ | $-4.265 \times 10^{-13}$ |
| | $A_5$ | 0 | $B_6$ | $6.417 \times 10^{-15}$ |
| | $A_6$ | $-6.374 \times 10^{-13}$ | $B_7$ | $9.179 \times 10^{-19}$ |
| | $A_7$ | 0 | $B_8$ | $-1.230 \times 10^{-19}$ |
| | $A_8$ | $-9.428 \times 10^{-17}$ | $B_9$ | $1.453 \times 10^{-20}$ |
| | $A_9$ | 0 | $B_{10}$ | $-1.881 \times 10^{-22}$ |
| | $A_{10}$ | $5.965 \times 10^{-21}$ | $B_{11}$ | $-1.468 \times 10^{-24}$ |
| | $A_{11}$ | 0 | $B_{12}$ | $-2.670 \times 10^{-26}$ |

FIG.13

| SURFACE NUMBER | MAIN SCANNING DIRECTIONAL COEFFICIENT | | SUBSCANNING DIRECTIONAL COEFFICIENT | |
|---|---|---|---|---|
| 2 | $R_m$ | -146.513 | $R_s$ | -199.813 |
| | K | $-1.857 \times 10^{-1}$ | $B_1$ | 0 |
| | $A_1$ | 0 | $B_2$ | $-2.125 \times 10^{-6}$ |
| | $A_2$ | 0 | $B_3$ | 0 |
| | $A_3$ | 0 | $B_4$ | $1.805 \times 10^{-11}$ |
| | $A_4$ | $1.774 \times 10^{-8}$ | $B_5$ | 0 |
| | $A_5$ | 0 | $B_6$ | $2.716 \times 10^{-14}$ |
| | $A_6$ | $1.384 \times 10^{-13}$ | $B_7$ | 0 |
| | $A_7$ | 0 | $B_8$ | $6.924 \times 10^{-19}$ |
| | $A_8$ | $-4.354 \times 10^{-17}$ | $B_9$ | 0 |
| | $A_9$ | 0 | $B_{10}$ | $-2.685 \times 10^{-22}$ |
| | $A_{10}$ | $7.168 \times 10^{-21}$ | $B_{11}$ | 0 |
| | $A_{11}$ | 0 | $B_{12}$ | $-5.778 \times 10^{-26}$ |

FIG.14

| SURFACE NUMBER | MAIN SCANNING DIRECTIONAL COEFFICIENT | | SUBSCANNING DIRECTIONAL COEFFICIENT | |
|---|---|---|---|---|
| 3 | $R_m$ | 400.875 | $R_s$ | −72.026 |
| | K | −12.603 | $B_1$ | 0 |
| | $A_1$ | 0 | $B_2$ | $-1.962 \times 10^{-7}$ |
| | $A_2$ | 0 | $B_3$ | 0 |
| | $A_3$ | 0 | $B_4$ | $2.230 \times 10^{-11}$ |
| | $A_4$ | $-7.349 \times 10^{-9}$ | $B_5$ | 0 |
| | $A_5$ | 0 | $B_6$ | $-1.022 \times 10^{15}$ |
| | $A_6$ | $-2.106 \times 10^{-13}$ | $B_7$ | 0 |
| | $A_7$ | 0 | $B_8$ | $1.081 \times 10^{-20}$ |
| | $A_8$ | $8.173 \times 10^{-18}$ | $B_9$ | 0 |
| | $A_9$ | 0 | $B_{10}$ | $6.363 \times 10^{-25}$ |
| | $A_{10}$ | $5.409 \times 10^{-22}$ | $B_{11}$ | 0 |
| | $A_{11}$ | 0 | $B_{12}$ | $-3.645 \times 10^{-29}$ |
| | $A_{12}$ | $-1.082 \times 10^{-26}$ | $B_{13}$ | 0 |
| | $A_{13}$ | 0 | $B_{14}$ | 0 |
| | $A_{14}$ | $-2.039 \times 10^{-32}$ | $B_{15}$ | 0 |

FIG.15

| SURFACE NUMBER | MAIN SCANNING DIRECTIONAL COEFFICIENT | | SUBSCANNING DIRECTIONAL COEFFICIENT | |
|---|---|---|---|---|
| 4 | $R_m$ | 824.882 | $R_s$ | $-27.588$ |
| | K | $-71.068$ | $B_1$ | $-8.546 \times 10^{-7}$ |
| | $A_1$ | 0 | $B_2$ | $4.161 \times 10^{-7}$ |
| | $A_2$ | 0 | $B_3$ | $-2.523 \times 10^{-11}$ |
| | $A_3$ | 0 | $B_4$ | $-2.960 \times 10^{-11}$ |
| | $A_4$ | $-1.324 \times 10^{-8}$ | $B_5$ | $2.114 \times 10^{-16}$ |
| | $A_5$ | 0 | $B_6$ | $1.160 \times 10^{-15}$ |
| | $A_6$ | $9.662 \times 10^{-14}$ | $B_7$ | $4.372 \times 10^{-22}$ |
| | $A_7$ | 0 | $B_8$ | $-1.098 \times 10^{-21}$ |
| | $A_8$ | $1.888 \times 10^{-17}$ | $B_9$ | $5.560 \times 10^{-24}$ |
| | $A_9$ | 0 | $B_{10}$ | $-7.785 \times 10^{-25}$ |
| | $A_{10}$ | $-3.102 \times 10^{-22}$ | $B_{11}$ | $-1.617 \times 10^{-29}$ |
| | $A_{11}$ | 0 | $B_{12}$ | $3.262 \times 10^{-30}$ |
| | $A_{12}$ | $7.298 \times 10^{-27}$ | $B_{13}$ | 0 |
| | $A_{13}$ | 0 | $B_{14}$ | 0 |
| | $A_{14}$ | $2.305 \times 10^{-32}$ | $B_{15}$ | 0 |

FIG.16

| LENS 6 | REFRACTIVE INDEX DISTRIBUTION COEFFICIENT | | | |
|---|---|---|---|---|
| | $n_0$ | 1.52398 | $a_0$ | 0 |
| | $b_0$ | $2.498 \times 10^{-6}$ | $d_0$ | $-1.510 \times 10^{-7}$ |
| | $b_1$ | $-3.165 \times 10^{-8}$ | $d_1$ | $-4.064 \times 10^{-9}$ |
| | $b_2$ | $-1.855 \times 10^{-10}$ | $d_2$ | $8.358 \times 10^{-11}$ |
| | $b_3$ | $3.002 \times 10^{-12}$ | $d_3$ | $5.886 \times 10^{-13}$ |
| | $b_4$ | $8.680 \times 10^{-14}$ | $d_4$ | $-9.710 \times 10^{-15}$ |
| | $c_0$ | $1.647 \times 10^{-6}$ | $e_0$ | $1.359 \times 10^{-7}$ |
| | $c_1$ | $-2.344 \times 10^{-8}$ | $e_1$ | $2.212 \times 10^{-9}$ |
| | $c_2$ | $-6.445 \times 10^{-11}$ | $e_2$ | $-1.022 \times 10^{-11}$ |
| | $c_3$ | $2.666 \times 10^{-12}$ | $e_3$ | $-5.394 \times 10^{-13}$ |
| | $c_4$ | $-1.854 \times 10^{-15}$ | $e_4$ | $-3.080 \times 10^{-15}$ |

FIG.17

| | REFRACTIVE INDEX DISTRIBUTION COEFFICIENT | | | |
|---|---|---|---|---|
| LENS 7 | $n_0$ | 1.52398 | $a_0$ | 0 |
| | $b_0$ | $-7.619 \times 10^{-7}$ | $d_0$ | $-4.091 \times 10^{-9}$ |
| | $b_1$ | $-5.664 \times 10^{-9}$ | $d_1$ | $4.058 \times 10^{-10}$ |
| | $b_2$ | $2.726 \times 10^{-10}$ | $d_2$ | $-1.569 \times 10^{-11}$ |
| | $b_3$ | $3.143 \times 10^{-13}$ | $d_3$ | $-2.782 \times 10^{-14}$ |
| | $b_4$ | $-7.369 \times 10^{-15}$ | $d_4$ | $1.191 \times 10^{-15}$ |
| | $c_0$ | $-2.408 \times 10^{-7}$ | $e_0$ | $2.020 \times 10^{-8}$ |
| | $c_1$ | $2.126 \times 10^{-9}$ | $e_1$ | $2.376 \times 10^{-11}$ |
| | $c_2$ | $1.906 \times 10^{-10}$ | $e_2$ | $-2.579 \times 10^{-12}$ |
| | $c_3$ | $-3.224 \times 10^{-14}$ | $e_3$ | $1.005 \times 10^{-14}$ |
| | $c_4$ | $-1.699 \times 10^{-14}$ | $e_4$ | $2.884 \times 10^{-16}$ |

FIG.18

| SURFACE NUMBER | MAIN SCANNING DIRECTIONAL COEFFICIENT | | SUBSCANNING DIRECTIONAL COEFFICIENT | |
|---|---|---|---|---|
| 1 | $R_m$ | 1616.426 | $R_s$ | −50.053 |
| | K | $1.976 \times 10^{+2}$ | $B_1$ | $-1.528 \times 10^{-5}$ |
| | $A_1$ | 0 | $B_2$ | $2.269 \times 10^{-6}$ |
| | $A_2$ | 0 | $B_3$ | $4.738 \times 10^{-9}$ |
| | $A_3$ | 0 | $B_4$ | $-1.624 \times 10^{-10}$ |
| | $A_4$ | $1.281 \times 10^{-8}$ | $B_5$ | $-8.632 \times 10^{-13}$ |
| | $A_5$ | 0 | $B_6$ | $7.137 \times 10^{-15}$ |
| | $A_6$ | $-6.374 \times 10^{-13}$ | $B_7$ | $1.537 \times 10^{-17}$ |
| | $A_7$ | 0 | $B_8$ | $1.603 \times 10^{-19}$ |
| | $A_8$ | $-9.428 \times 10^{-17}$ | $B_9$ | $2.191 \times 10^{-20}$ |
| | $A_9$ | 0 | $B_{10}$ | $-2.218 \times 10^{-22}$ |
| | $A_{10}$ | $5.965 \times 10^{-21}$ | $B_{11}$ | $-2.095 \times 10^{-24}$ |
| | $A_{11}$ | 0 | $B_{12}$ | $-5.115 \times 10^{-26}$ |

FIG.19

| SURFACE NUMBER | MAIN SCANNING DIRECTIONAL COEFFICIENT | | SUBSCANNING DIRECTIONAL COEFFICIENT | |
|---|---|---|---|---|
| 2 | $R_m$ | −146.513 | $R_s$ | −203.654 |
| | $K$ | $-1.857 \times 10^{-1}$ | $B_1$ | 0 |
| | $A_1$ | 0 | $B_2$ | $-2.185 \times 10^{-6}$ |
| | $A_2$ | 0 | $B_3$ | 0 |
| | $A_3$ | 0 | $B_4$ | $1.472 \times 10^{-11}$ |
| | $A_4$ | $1.774 \times 10^{-8}$ | $B_5$ | 0 |
| | $A_5$ | 0 | $B_6$ | $3.276 \times 10^{-14}$ |
| | $A_6$ | $1.384 \times 10^{-13}$ | $B_7$ | 0 |
| | $A_7$ | 0 | $B_8$ | $7.255 \times 10^{-19}$ |
| | $A_8$ | $-4.354 \times 10^{-17}$ | $B_9$ | 0 |
| | $A_9$ | 0 | $B_{10}$ | $-3.528 \times 10^{-22}$ |
| | $A_{10}$ | $7.168 \times 10^{-21}$ | $B_{11}$ | 0 |
| | $A_{11}$ | 0 | $B_{12}$ | $-6.967 \times 10^{-26}$ |

FIG.21

| SURFACE NUMBER | MAIN SCANNING DIRECTIONAL COEFFICIENT | | SUBSCANNING DIRECTIONAL COEFFICIENT | |
|---|---|---|---|---|
| 3 | $R_m$ | 400.875 | $R_s$ | −71.963 |
| | K | −12.603 | $B_1$ | 0 |
| | $A_1$ | 0 | $B_2$ | $-1.926 \times 10^{-7}$ |
| | $A_2$ | 0 | $B_3$ | 0 |
| | $A_3$ | 0 | $B_4$ | $2.193 \times 10^{-11}$ |
| | $A_4$ | $-7.349 \times 10^{-9}$ | $B_5$ | 0 |
| | $A_5$ | 0 | $B_6$ | $-1.072 \times 10^{-15}$ |
| | $A_6$ | $-2.106 \times 10^{-13}$ | $B_7$ | 0 |
| | $A_7$ | 0 | $B_8$ | $1.494 \times 10^{-20}$ |
| | $A_8$ | $8.173 \times 10^{-18}$ | $B_9$ | 0 |
| | $A_9$ | 0 | $B_{10}$ | $8.783 \times 10^{-25}$ |
| | $A_{10}$ | $5.409 \times 10^{-22}$ | $B_{11}$ | 0 |
| | $A_{11}$ | 0 | $B_{12}$ | $-6.080 \times 10^{-29}$ |
| | $A_{12}$ | $-1.082 \times 10^{-26}$ | $B_{13}$ | 0 |
| | $A_{13}$ | 0 | $B_{14}$ | 0 |
| | $A_{14}$ | $-2.039 \times 10^{-32}$ | $B_{15}$ | 0 |

FIG.22

| SURFACE NUMBER | MAIN SCANNING DIRECTIONAL COEFFICIENT | | SUBSCANNING DIRECTIONAL COEFFICIENT | |
|---|---|---|---|---|
| 4 | $R_m$ | 824.882 | $R_s$ | −27.601 |
| | $K$ | −71.068 | $B_1$ | $-6.373 \times 10^{-7}$ |
| | $A_1$ | 0 | $B_2$ | $4.117 \times 10^{-7}$ |
| | $A_2$ | 0 | $B_3$ | $-6.716 \times 10^{11}$ |
| | $A_3$ | 0 | $B_4$ | $-2.953 \times 10^{-11}$ |
| | $A_4$ | $-1.324 \times 10^{-8}$ | $B_5$ | $4.903 \times 10^{-15}$ |
| | $A_5$ | 0 | $B_6$ | $1.235 \times 10^{-15}$ |
| | $A_6$ | $9.662 \times 10^{-14}$ | $B_7$ | $-1.488 \times 10^{-19}$ |
| | $A_7$ | 0 | $B_8$ | $-3.581 \times 10^{-21}$ |
| | $A_8$ | $1.888 \times 10^{-17}$ | $B_9$ | $-7.929 \times 10^{-24}$ |
| | $A_9$ | 0 | $B_{10}$ | $-1.047 \times 10^{-24}$ |
| | $A_{10}$ | $-3.102 \times 10^{22}$ | $B_{11}$ | $6.855 \times 10^{-28}$ |
| | $A_{11}$ | 0 | $B_{12}$ | $1.151 \times 10^{-29}$ |
| | $A_{12}$ | $7.298 \times 10^{-27}$ | $B_{13}$ | 0 |
| | $A_{13}$ | 0 | $B_{14}$ | 0 |
| | $A_{14}$ | $2.305 \times 10^{-32}$ | $B_{15}$ | 0 |

FIG.25

| SURFACE NUMBER | SUBSCANNING DIRECTIONAL COEFFICIENT | |
|---|---|---|
| 1 | $R_s$ | $-205.150$ |
| | $B_1$ | $-9.336 \times 10^{-6}$ |
| | $B_2$ | $-2.520 \times 10^{-6}$ |
| | $B_3$ | $-5.029 \times 10^{-8}$ |
| | $B_4$ | $6.732 \times 10^{-10}$ |

FIG.26

| SURFACE NUMBER | SUBSCANNING DIRECTIONAL COEFFICIENT | |
|---|---|---|
| 2 | $R_s$ | $-154.632$ |
| | $B_1$ | $4.010 \times 10^{-6}$ |
| | $B_2$ | $1.563 \times 10^{-6}$ |
| | $B_3$ | $-1.914 \times 10^{-8}$ |
| | $B_4$ | $-5.438 \times 10^{-10}$ |

FIG.27

| | REFRACTIVE INDEX DISTRIBUTION COEFFICIENT | | | |
|---|---|---|---|---|
| LENS 6-1 | $n_0$ | 1.57915 | $a_0$ | 0 |
| | $b_0$ | $6.177 \times 10^{-7}$ | $d_0$ | $4.588 \times 10^{-8}$ |
| | $b_1$ | $-6.978 \times 10^{-8}$ | $d_1$ | $1.375 \times 10^{-8}$ |
| | $b_2$ | $1.393 \times 10^{-9}$ | $d_2$ | $-8.631 \times 10^{-10}$ |
| | $b_3$ | $2.579 \times 10^{-11}$ | $d_3$ | $-7.888 \times 10^{-12}$ |
| | $b_4$ | $-5.993 \times 10^{-13}$ | $d_4$ | $3.777 \times 10^{-13}$ |
| | $c_0$ | $5.379 \times 10^{-6}$ | $e_0$ | $1.175 \times 10^{-7}$ |
| | $c_1$ | $-8.277 \times 10^{-8}$ | $e_1$ | $-2.200 \times 10^{-9}$ |
| | $c_2$ | $2.178 \times 10^{-9}$ | $e_2$ | $-3.542 \times 10^{-10}$ |
| | $c_3$ | $7.826 \times 10^{-12}$ | $e_3$ | $3.176 \times 10^{-12}$ |
| | $c_4$ | $-8.340 \times 10^{-13}$ | $e_4$ | $1.240 \times 10^{-13}$ |

FIG.28

| SURFACE NUMBER | SUBSCANNING DIRECTIONAL COEFFICIENT | |
|---|---|---|
| 5 | $R_s$ | $-110.233$ |
| | $B_2$ | $-5.727 \times 10^{-8}$ |
| | $B_4$ | $-5.412 \times 10^{-13}$ |
| | $B_6$ | $2.414 \times 10^{-18}$ |
| | $B_8$ | $-5.103 \times 10^{-23}$ |
| | $B_{10}$ | $-4.952 \times 10^{-28}$ |

FIG.29

| SURFACE NUMBER | SUBSCANNING DIRECTIONAL COEFFICIENT | |
|---|---|---|
| 6 | $R_s$ | $-45.686$ |
| | $B_1$ | $2.208 \times 10^{-7}$ |
| | $B_2$ | $-2.510 \times 10^{-8}$ |
| | $B_3$ | $-1.054 \times 10^{-11}$ |
| | $B_4$ | $1.112 \times 10^{-13}$ |
| | $B_5$ | $3.619 \times 10^{-16}$ |
| | $B_6$ | $-4.754 \times 10^{-18}$ |
| | $B_7$ | $-3.897 \times 10^{-21}$ |
| | $B_8$ | $1.921 \times 10^{-23}$ |
| | $B_9$ | $2.597 \times 10^{-26}$ |
| | $B_{10}$ | $2.074 \times 10^{-27}$ |

FIG.32

| SURFACE NUMBER | MAIN SCANNING DIRECTIONAL COEFFICIENT | | SUBSCANNING DIRECTIONAL COEFFICIENT | |
|---|---|---|---|---|
| 1 | $R_m$ | −1030.233 | $R_s$ | −89.519 |
| | K | $-4.042 \times 10^{+2}$ | $B_1$ | $-9.318 \times 10^{-6}$ |
| | $A_1$ | 0 | $B_2$ | $3.270 \times 10^{-6}$ |
| | $A_2$ | 0 | $B_3$ | $4.132 \times 10^{-9}$ |
| | $A_3$ | 0 | $B_4$ | $-4.208 \times 10^{-10}$ |
| | $A_4$ | $6.005 \times 10^{-8}$ | $B_5$ | $-1.170 \times 10^{-12}$ |
| | $A_5$ | 0 | $B_6$ | $4.371 \times 10^{-14}$ |
| | $A_6$ | $-7.538 \times 10^{-13}$ | $B_7$ | $2.348 \times 10^{-16}$ |
| | $A_7$ | 0 | $B_8$ | $-6.213 \times 10^{-18}$ |
| | $A_8$ | $-4.037 \times 10^{-16}$ | $B_9$ | $-3.968 \times 10^{-20}$ |
| | $A_9$ | 0 | $B_{10}$ | $-3.874 \times 10^{-21}$ |
| | $A_{10}$ | $4.592 \times 10^{-20}$ | $B_{11}$ | $3.817 \times 10^{-24}$ |
| | $A_{11}$ | 0 | $B_{12}$ | $4.536 \times 10^{-25}$ |
| | $A_{12}$ | $-2.397 \times 10^{-24}$ | $B_{13}$ | 0 |

FIG.33

| SURFACE NUMBER | MAIN SCANNING DIRECTIONAL COEFFICIENT | | SUBSCANNING DIRECTIONAL COEFFICIENT | |
|---|---|---|---|---|
| 2 | $R_m$ | −109.082 | $R_s$ | −110.881 |
| | K | $-5.428 \times 10^{-1}$ | $B_1$ | 0 |
| | $A_1$ | 0 | $B_2$ | $-3.653 \times 10^{-7}$ |
| | $A_2$ | 0 | $B_3$ | 0 |
| | $A_3$ | 0 | $B_4$ | $2.337 \times 10^{-11}$ |
| | $A_4$ | $9.539 \times 10^{-8}$ | $B_5$ | 0 |
| | $A_5$ | 0 | $B_6$ | $8.426 \times 10^{-14}$ |
| | $A_6$ | $4.882 \times 10^{-13}$ | $B_7$ | 0 |
| | $A_7$ | 0 | $B_8$ | $-1.026 \times 10^{-17}$ |
| | $A_8$ | $-1.199 \times 10^{-16}$ | $B_9$ | 0 |
| | $A_9$ | 0 | $B_{10}$ | $-2.202 \times 10^{-21}$ |
| | $A_{10}$ | $5.030 \times 10^{-20}$ | $B_{11}$ | 0 |
| | $A_{11}$ | 0 | $B_{12}$ | $1.225 \times 10^{-26}$ |
| | $A_{12}$ | $-5.654 \times 10^{-24}$ | $B_{13}$ | 0 |

FIG.34

| SURFACE NUMBER | MAIN SCANNING DIRECTIONAL COEFFICIENT | | SUBSCANNING DIRECTIONAL COEFFICIENT | |
|---|---|---|---|---|
| 3 | $R_m$ | 1493.655 | $R_s$ | −70.072 |
| | K | 54.794 | $B_1$ | 0 |
| | $A_1$ | 0 | $B_2$ | $-8.702 \times 10^{-8}$ |
| | $A_2$ | 0 | $B_3$ | 0 |
| | $A_3$ | 0 | $B_4$ | $2.829 \times 10^{-11}$ |
| | $A_4$ | $-7.607 \times 10^{-9}$ | $B_5$ | 0 |
| | $A_5$ | 0 | $B_6$ | $-1.930 \times 10^{-15}$ |
| | $A_6$ | $-6.311 \times 10^{-13}$ | $B_7$ | 0 |
| | $A_7$ | 0 | $B_8$ | $2.767 \times 10^{-20}$ |
| | $A_8$ | $6.134 \times 10^{-17}$ | $B_9$ | 0 |
| | $A_9$ | 0 | $B_{10}$ | $2.177 \times 10^{-24}$ |
| | $A_{10}$ | $-1.482 \times 10^{-21}$ | $B_{11}$ | 0 |
| | $A_{11}$ | 0 | $B_{12}$ | $-6.108 \times 10^{-29}$ |
| | $A_{12}$ | $2.429 \times 10^{-26}$ | $B_{13}$ | 0 |
| | $A_{13}$ | 0 | $B_{14}$ | 0 |
| | $A_{14}$ | $-1.689 \times 10^{-30}$ | $B_{15}$ | 0 |

FIG.35

| SURFACE NUMBER | MAIN SCANNING DIRECTIONAL COEFFICIENT | | SUBSCANNING DIRECTIONAL COEFFICIENT | |
|---|---|---|---|---|
| 4 | $R_m$ | 1748.584 | $R_s$ | −28.035 |
| | $K$ | $-5.489 \times 10^{+2}$ | $B_1$ | $-1.440 \times 10^{-6}$ |
| | $A_1$ | 0 | $B_2$ | $4.696 \times 10^{-7}$ |
| | $A_2$ | 0 | $B_3$ | $1.854 \times 10^{-11}$ |
| | $A_3$ | 0 | $B_4$ | $-4.153 \times 10^{-11}$ |
| | $A_4$ | $-4.978 \times 10^{-8}$ | $B_5$ | $-8.494 \times 10^{-16}$ |
| | $A_5$ | 0 | $B_6$ | $2.193 \times 10^{-15}$ |
| | $A_6$ | $2.325 \times 10^{-12}$ | $B_7$ | $9.004 \times 10^{-19}$ |
| | $A_7$ | 0 | $B_8$ | $-9.272 \times 10^{-21}$ |
| | $A_8$ | $-7.619 \times 10^{-17}$ | $B_9$ | $-1.328 \times 10^{-22}$ |
| | $A_9$ | 0 | $B_{10}$ | $-1.410 \times 10^{-24}$ |
| | $A_{10}$ | $3.323 \times 10^{-21}$ | $B_{11}$ | $5.520 \times 10^{-27}$ |
| | $A_{11}$ | 0 | $B_{12}$ | $4.513 \times 10^{-30}$ |
| | $A_{12}$ | $-3.571 \times 10^{-26}$ | $B_{13}$ | 0 |
| | $A_{13}$ | 0 | $B_{14}$ | 0 |
| | $A_{14}$ | $-2.199 \times 10^{-30}$ | $B_{15}$ | 0 |

FIG.36

| | REFRACTIVE INDEX DISTRIBUTION COEFFICIENT | | | |
|---|---|---|---|---|
| LENS 6 | $n_0$ | 1.52398 | $a_0$ | 0 |
| | $b_0$ | $-5.982 \times 10^{-6}$ | $d_0$ | $4.893 \times 10^{-8}$ |
| | $b_1$ | $1.216 \times 10^{-7}$ | $d_1$ | $-2.568 \times 10^{-9}$ |
| | $b_2$ | $3.043 \times 10^{-9}$ | $d_2$ | $-1.387 \times 10^{-11}$ |
| | $b_3$ | $-2.514 \times 10^{-11}$ | $d_3$ | $8.132 \times 10^{-13}$ |
| | $b_4$ | $-3.347 \times 10^{-13}$ | $d_4$ | $-1.718 \times 10^{-14}$ |
| | $c_0$ | $3.097 \times 10^{-6}$ | $e_0$ | $-7.454 \times 10^{-8}$ |
| | $c_1$ | $2.186 \times 10^{-9}$ | $e_1$ | $-3.480 \times 10^{-10}$ |
| | $c_2$ | $-2.809 \times 10^{-10}$ | $e_2$ | $5.096 \times 10^{-11}$ |
| | $c_3$ | $-4.637 \times 10^{-12}$ | $e_3$ | $2.879 \times 10^{-13}$ |
| | $c_4$ | $7.089 \times 10^{-14}$ | $e_4$ | $-1.114 \times 10^{-14}$ |

FIG.37

| | REFRACTIVE INDEX DISTRIBUTION COEFFICIENT | | | |
|---|---|---|---|---|
| LENS 7 | $n_0$ | 1.52398 | $a_0$ | 0 |
| | $b_0$ | $-3.503 \times 10^{-6}$ | $d_0$ | $-2.773 \times 10^{-8}$ |
| | $b_1$ | $7.828 \times 10^{-9}$ | $d_1$ | $-4.553 \times 10^{-10}$ |
| | $b_2$ | $1.683 \times 10^{-10}$ | $d_2$ | $3.401 \times 10^{-12}$ |
| | $b_3$ | $-7.862 \times 10^{-14}$ | $d_3$ | $3.266 \times 10^{-14}$ |
| | $b_4$ | $3.050 \times 10^{-15}$ | $d_4$ | $-5.724 \times 10^{-17}$ |
| | $c_0$ | $-1.695 \times 10^{-7}$ | $e_0$ | $-2.686 \times 10^{-9}$ |
| | $c_1$ | $-2.907 \times 10^{-9}$ | $e_1$ | $1.665 \times 10^{-10}$ |
| | $c_2$ | $-5.463 \times 10^{-11}$ | $e_2$ | $3.730 \times 10^{-12}$ |
| | $c_3$ | $-1.121 \times 10^{-13}$ | $e_3$ | $-7.390 \times 10^{-15}$ |
| | $c_4$ | $-1.893 \times 10^{-15}$ | $e_4$ | $-2.065 \times 10^{-16}$ |

FIG.38

| SURFACE NUMBER | MAIN SCANNING DIRECTIONAL COEFFICIENT | | SUBSCANNING DIRECTIONAL COEFFICIENT | |
|---|---|---|---|---|
| 1 | $R_m$ | −1030.233 | $R_s$ | −89.134 |
| | K | $-4.042 \times 10^{+2}$ | $B_1$ | $-1.008 \times 10^{-5}$ |
| | $A_1$ | 0 | $B_2$ | $3.251 \times 10^{-6}$ |
| | $A_2$ | 0 | $B_3$ | $2.874 \times 10^{-9}$ |
| | $A_3$ | 0 | $B_4$ | $-4.214 \times 10^{-10}$ |
| | $A_4$ | $6.005 \times 10^{-8}$ | $B_5$ | $-6.411 \times 10^{-13}$ |
| | $A_5$ | 0 | $B_6$ | $4.290 \times 10^{-14}$ |
| | $A_6$ | $-7.538 \times 10^{-13}$ | $B_7$ | $1.784 \times 10^{-16}$ |
| | $A_7$ | 0 | $B_8$ | $-6.002 \times 10^{-18}$ |
| | $A_8$ | $-4.037 \times 10^{-16}$ | $B_9$ | $-4.885 \times 10^{-20}$ |
| | $A_9$ | 0 | $B_{10}$ | $-3.705 \times 10^{-21}$ |
| | $A_{10}$ | $4.592 \times 10^{-20}$ | $B_{11}$ | $5.819 \times 10^{-24}$ |
| | $A_{11}$ | 0 | $B_{12}$ | $4.357 \times 10^{-25}$ |
| | $A_{12}$ | $-2.397 \times 10^{-24}$ | $B_{13}$ | 0 |

FIG.39

| SURFACE NUMBER | MAIN SCANNING DIRECTIONAL COEFFICIENT | | SUBSCANNING DIRECTIONAL COEFFICIENT | |
|---|---|---|---|---|
| 2 | $R_m$ | −109.082 | $R_s$ | −110.881 |
| | K | $-5.428 \times 10^{-1}$ | $B_1$ | 0 |
| | $A_1$ | 0 | $B_2$ | $-3.296 \times 10^{-7}$ |
| | $A_2$ | 0 | $B_3$ | 0 |
| | $A_3$ | 0 | $B_4$ | $3.708 \times 10^{-11}$ |
| | $A_4$ | $9.539 \times 10^{-8}$ | $B_5$ | 0 |
| | $A_5$ | 0 | $B_6$ | $7.749 \times 10^{-14}$ |
| | $A_6$ | $4.882 \times 10^{-13}$ | $B_7$ | 0 |
| | $A_7$ | 0 | $B_8$ | $-1.009 \times 10^{-17}$ |
| | $A_8$ | $-1.199 \times 10^{-16}$ | $B_9$ | 0 |
| | $A_9$ | 0 | $B_{10}$ | $-2.056 \times 10^{-21}$ |
| | $A_{10}$ | $5.030 \times 10^{-20}$ | $B_{11}$ | 0 |
| | $A_{11}$ | 0 | $B_{12}$ | $1.342 \times 10^{-26}$ |
| | $A_{12}$ | $-5.654 \times 10^{-24}$ | $B_{13}$ | 0 |

FIG.40A
FIG.40B
FIG.40C
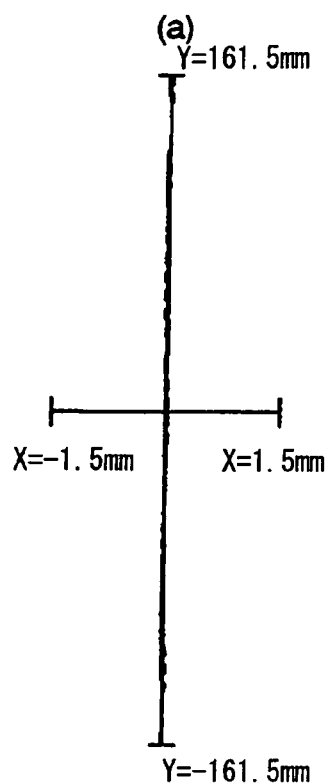
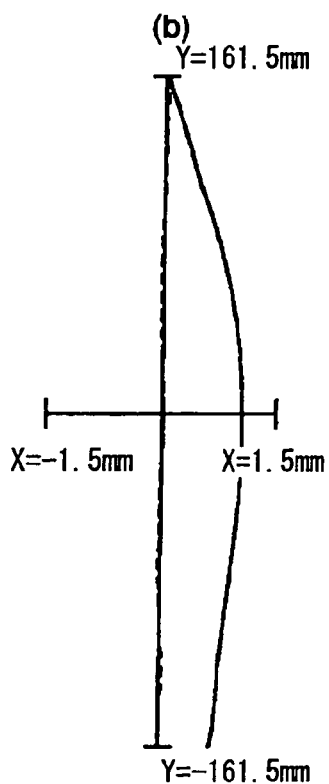
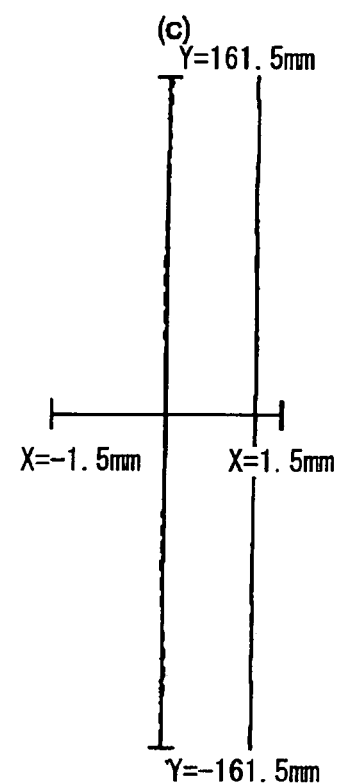
FIG.40D
FIG.40E
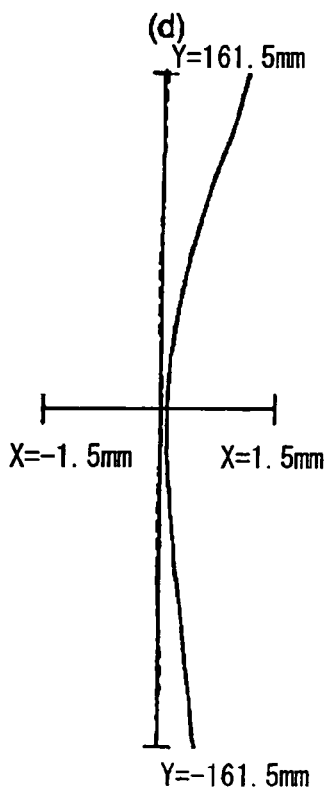
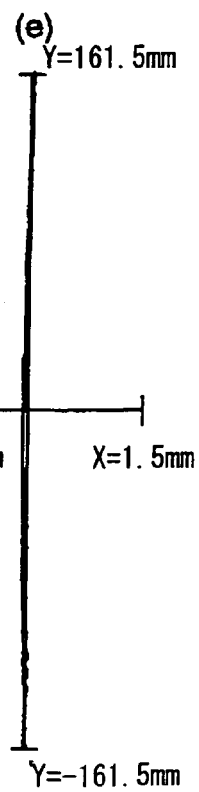

FIG.41

| SURFACE NUMBER | MAIN SCANNING DIRECTIONAL COEFFICIENT | | SUBSCANNING DIRECTIONAL COEFFICIENT | |
|---|---|---|---|---|
| 3 | $R_m$ | 400.875 | $R_s$ | −70.037 |
| | K | −12.603 | $B_1$ | 0 |
| | $A_1$ | 0 | $B_2$ | $-8.885 \times 10^{-8}$ |
| | $A_2$ | 0 | $B_3$ | 0 |
| | $A_3$ | 0 | $B_4$ | $2.816 \times 10^{-11}$ |
| | $A_4$ | $-7.349 \times 10^{-9}$ | $B_5$ | 0 |
| | $A_5$ | 0 | $B_6$ | $-1.876 \times 10^{-15}$ |
| | $A_6$ | $-2.106 \times 10^{-13}$ | $B_7$ | 0 |
| | $A_7$ | 0 | $B_8$ | $2.500 \times 10^{-20}$ |
| | $A_8$ | $8.173 \times 10^{-18}$ | $B_9$ | 0 |
| | $A_9$ | 0 | $B_{10}$ | $2.406 \times 10^{-24}$ |
| | $A_{10}$ | $5.409 \times 10^{-22}$ | $B_{11}$ | 0 |
| | $A_{11}$ | 0 | $B_{12}$ | $-5.611 \times 10^{-29}$ |
| | $A_{12}$ | $-1.082 \times 10^{-26}$ | $B_{13}$ | 0 |
| | $A_{13}$ | 0 | $B_{14}$ | 0 |
| | $A_{14}$ | $-2.039 \times 10^{-32}$ | $B_{15}$ | 0 |

FIG.42

| SURFACE NUMBER | MAIN SCANNING DIRECTIONAL COEFFICIENT | | SUBSCANNING DIRECTIONAL COEFFICIENT | |
|---|---|---|---|---|
| 4 | $R_m$ | 824.882 | $R_s$ | −28.036 |
| | K | −71.068 | $B_1$ | $-1.390 \times 10^{-6}$ |
| | $A_1$ | 0 | $B_2$ | $4.751 \times 10^{-7}$ |
| | $A_2$ | 0 | $B_3$ | $6.148 \times 10^{-11}$ |
| | $A_3$ | 0 | $B_4$ | $-4.147 \times 10^{-11}$ |
| | $A_4$ | $-1.324 \times 10^{-8}$ | $B_5$ | $-4.675 \times 10^{-15}$ |
| | $A_5$ | 0 | $B_6$ | $2.118 \times 10^{-15}$ |
| | $A_6$ | $9.662 \times 10^{-14}$ | $B_7$ | $8.818 \times 10^{-19}$ |
| | $A_7$ | 0 | $B_8$ | $-3.193 \times 10^{-21}$ |
| | $A_8$ | $1.888 \times 10^{-17}$ | $B_9$ | $-1.042 \times 10^{-22}$ |
| | $A_9$ | 0 | $B_{10}$ | $-1.202 \times 10^{-24}$ |
| | $A_{10}$ | $-3.102 \times 10^{-22}$ | $B_{11}$ | $3.997 \times 10^{-27}$ |
| | $A_{11}$ | 0 | $B_{12}$ | $2.335 \times 10^{-31}$ |
| | $A_{12}$ | $7.298 \times 10^{-27}$ | $B_{13}$ | 0 |
| | $A_{13}$ | 0 | $B_{14}$ | 0 |
| | $A_{14}$ | $2.305 \times 10^{-32}$ | $B_{15}$ | 0 |

OPTICAL ELEMENT, OPTICAL SCANNER AND IMAGE FORMING APPARATUS

CROSS-REFERENCE TO RELATED APPLICATIONS

This application is a divisional of and claims priority under 35 U.S.C. §120 to co-pending U.S. application Ser. No. 10/438,065, filed May 15, 2003, and is based upon and claims the benefit of priority under 35 U.S.C. § 119 from the prior Japanese Patent Application No. 2002-147934, filed on May 22, 2002, the entire contents of each of which are incorporated herein by reference.

BACKGROUND OF THE INVENTION

1. Field of the Invention

The present invention generally relates to an optical element, an optical scanner and an image forming apparatus, and more particularly to an optical element that can be preferably used as a writing system of a recording apparatus such as a digital copier, a laser printer and a laser facsimile, an optical scanner using the optical element, and an image forming apparatus using the optical scanner.

2. Description of the Related Art

In recent times, an optical scanner lens being an optical element used in an optical scanner has been fabricated through plastic molding. In order to form a lens through plastic molding, a hot melted plastic material is molded in accordance with a metal pattern and then is cooled in the metal pattern. In the cooling process, a peripheral portion of the metal pattern tends to be cooled earlier than a center portion thereof. As a result, there arises a nonuniform density distribution in the interior of the molded plastics in that a fast-cooled portion has a relatively higher density than a slow-cooled portion. Also, there arises denaturation in the interior of the molded plastics. For this reason, the formed lens cannot have a uniform refractive index in the inner portion thereof, and there arises a refractive index distribution therein.

A description will now be given, with reference to FIG. 1 and FIG. 2, of characteristics of a conventional plastic lens.

FIGS. 1A and 1B show an example of a refractive index distribution in a conventional plastic lens. When an optical scanner lens 6 is virtually cut in a cross-section including the optical axis in parallel to the main scanning direction, FIG. 1A-(a) shows a contour of a refractive index distribution with respect to the cross-section. FIG. 1A-(b) shows the refractive index distribution along the center of the lens thickness as shown in a dashed line in FIG. 1A-(a). In contrast, when the optical scanner lens 6 is virtually cut in a cross-section including the optical axis in parallel to the sub-scanning direction, FIG. 1B-(c) shows a contour of the refractive index distribution with respect to the cross-section. FIG. 1B-(d) shows the refractive index distribution on a surface that includes the optical axis and is parallel to the main scanning direction. FIG. 1B-(e) shows the refractive index distribution along the center of the lens thickness in FIG. 1B-(c). As seen in FIGS. 1A and 1B, the interior of the lens generally has a greater refractive index in the peripheral portion thereof than in the center portion thereof, because the peripheral portion is cooled earlier than the center portion and the peripheral portion has a relatively higher density than the center portion as mentioned above.

In general, when an optical scanner lens contains a refractive index distribution therein, optical characteristics of the optical scanner lens tend to be slightly different from those expected of an optical scanner lens designed to have a uniform refractive index. On average, the optical scanner lens tends to have a higher refractive index in the peripheral portion thereof than in the center portion thereof. In this case, an optical spot, which should be focused on a scanned surface, is actually focused at a position farther away from an expected position with respect to an optical deflector.

Also, when the optical spot scans an effective scanned region of the scanned surface, the diameter of the optical spot varies in accordance with image heights based on a field curvature of the optical scanner lens. However, when the above-mentioned refractive index distribution arises in the interior of the lens, the diameter also varies in accordance with the refractive index distribution.

FIG. 2 shows relations between the diameter of an optical spot and beam defocus in two cases where a lens has a refractive index distribution and no refractive index distribution. Here, a beam defocus means a difference between a focused position (image forming position) of the optical spot and a position of a scanned surface. In FIG. 2, the vertical axis represents the diameter of the optical spot, and the horizontal axis represents an amount of the beam defocus.

In a lens whose refractive index is uniform at any position therein such as a glass lens, that is, a lens that has no refractive index distribution, the optical spot diameter and the defocus amount have the relation as shown by a dotted curve in FIG. 2. As seen in FIG. 2, the optical spot diameter is minimized at a position on the photoreceptor surface, that is, the scanned surface. The beam defocus is 0 at that position. On the other hand, when the lens contains a refractive index distribution, the optical spot diameter and the defocus amount have the relation as shown by a solid curve in FIG. 2. As seen in FIG. 2, the optical spot diameter on the scanned surface is apparently larger than the expected size at the above-mentioned intersection of the dotted curve and the vertical axis due to misalignment of the focused position.

Also, a focused position is not always misaligned by a constant amount for each image height due to refractive index distributions. In the case of a constant misalignment for each image height, if focused positions are adjusted to be located on the dotted curve in FIG. 2, for instance, by moving some components of an optical system in the optical axis direction, it is possible to obtain a proper optical spot for all image heights.

However, when an optical scanner lens in use has a refractive index distribution, the amount of the focused position misalignment is not constant for each image height. Thus, even if a focused position corresponding to a certain image height is adjusted and a proper optical spot is obtained at that position, it is impossible to assure that the adjustment succeeds for other image heights. In particular, when the diameter of an optical spot is narrowed down so that an image forming apparatus can create a higher-quality image, this problem becomes more significant.

If an optical scanner lens is designed without consideration of a refractive index distribution thereof, it is likely that the optical scanner lens cannot create a high-quality image because the optical spot diameter has wide variance with respect to the image heights. Also, when an optical scanner lens with a refractive index distribution is used in a multi-beam optical scanner, the multi-beam optical scanner has a problem in that the multi-beam optical scanner has various pitches between optical spots on a scanned surface for image heights. This problem is caused by the fact that each image height has a different horizontal magnification of image formation between an optical deflector and the scanned surface with respect to the sub-scanning direction. For this problem, when the image heights have a large deviation of horizontal magnifications, there appears an irregularity in the recorded image. In particular, when the pitches of the optical spots are made narrow so that an image forming apparatus can form a high-quality image, the irregularity becomes more significant.

Japanese Laid-Open Patent Applications No. 09-049976, No. 10-288749, No. 11-002768, No. 11-038314, and others disclose some techniques related to an optical scanner whose optical scanner lens is designed with consideration of a refractive index distribution. Also, Japanese Laid-Open Patent Application No. 11-044641 and others disclose means for measuring a refractive index distribution in a lens.

Japanese Laid-Open Patent Application No. 09-049976 discloses an optical scanner lens. The optical scanner lens is formed such that a focal distance computed based on a curvature of the optical scanner lens surface, a refractive index of a material thereof, and a thickness thereof with respect to the optical axis direction is less than a measured focal distance. This optical scanner lens makes it possible to properly correct misalignment of a focused position due to a refractive index distribution in the lens that results from plastic molding of the lens. As mentioned above, when lenses are manufactured in plastic molding, the lenses tend to contain refractive index distributions. However, when the lenses are formed of an identical material under an identical condition on the plastic molding, the lenses have substantially less different refractive index distributions from each other and, therefore, it is possible to obtain information regarding the refractive index distributions through experiments in advance. For this reason, if a shape of the metal pattern in use is corrected based on the information, it is possible to effectively correct the focused position misalignment due to the refractive index distributions.

Regarding the shape correction of the metal pattern, when an amount of the correction is small, it is possible to easily determine with accuracy the shape correction and to easily reshape the metal pattern to be corrected. In this conventional optical scanner lens, however, the curvature and other factors thereof are designed to make the expected focal distance less than the measured focal distance for all image heights so as to eliminate the focused position alignment due to the refractive index distribution on the scanned surface. As a result, it is impossible to avoid a considerably large correction of the metal pattern. Thus, this conventional technique for forming the optical scanner lens has a difficulty with accurate correction. Furthermore, even if the focused position misalignment is properly corrected, a ratio of a deviation F of the focused position misalignment of an optical spot with respect to image heights to an effective write width W scanned by the optical spot on the scanned surface, that is, a ratio F/W, is improved to only at most about 0.007. In order to achieve higher image quality, it is necessary to make the ratio F/W much smaller than 0.007.

As mentioned above, even if an optical scanner lens contains a refractive index distribution, it is possible to obtain proper optical spots for all image heights, for instance, by shifting some components of the optical system in the optical axis direction, as long as focused positions are misaligned by a constant distance for all image heights. In shape correction of a metal pattern, the correction should be intended not to make focused position misalignment uniform for all image heights but to correct a deviation with respect to the image heights as slightly as possible even if the focused position misalignment persists on the scanned surface in this correction. If the metal pattern is reshaped in such a way, it is possible to correct the metal pattern as slightly as possible with high accuracy.

Japanese Laid-Open Patent Application No. 10-288749 discloses an optical scanner lens that has a sufficient depth margin. In such a configuration, even if the optical scanner lens contains a refractive index distribution, it is possible to obtain proper optical spots.

However, when the diameter of an optical spot by the optical scanner lens is made smaller, it becomes difficult to maintain sufficient depth margin. Furthermore, the optical scanner lens has additional problems in that the lens must be shaped and installed under quite severe error constraints thereof. Adversely, these problems increase the fabrication cost. In addition, the optical scanner lens is not preferable in terms of image quality.

Japanese Laid-Open Patent Application No. 11-002768 discloses an optical scanner that can effectively correct misalignment of a focused position of a first optical system.

In this conventional optical scanner, although the first optical system can correct the focused position misalignment for all image heights by an equal correction amount in an identical direction, it is impossible to individually correct the misalignment of each of the focused positions. Thus, only when the refractive index has a significantly narrow distribution and the focused positions are misaligned by a constant for all the image heights, does the optical scanner operate effectively. However, the focused positions are distinctly misaligned for the individual image heights due to the refractive index distribution. In particular, this tendency is remarkable for lenses whose thickness has a large deviation. In this case, it is impossible to obtain proper optical spots.

Japanese Laid-Open Patent Application No. 11-038314 discloses an optical scanner that can effectively correct focused position misalignment due to a refractive index distribution by shifting the focused positions in the negative direction with respect to the image height center portion and in the positive direction with respect to the image height peripheral portion.

When the refractive index has a significantly narrow distribution and the focused positions are misaligned by a constant for all image heights, the optical scanner operates effectively. However, even if practical plastic lenses are formed in the fashion according to this disclosure, it is difficult to obtain proper optical spots.

Here, it should be noted that a deviation of optical spot pitches with respect to image heights is not mentioned in the above-mentioned disclosures.

SUMMARY OF THE INVENTION

It is a general object of the present invention to provide an optical element, an optical scanner and an image forming apparatus in which the above-mentioned problems are eliminated.

A more specific object of the present invention is to provide an optical element that can effectively correct misalignment of focused positions of optical spots due to a refractive index distribution in an optical scanner lens being the optical element and properly eliminate a deviation of pitches of the optical spots with respect to image heights, an optical scanner using the optical element, and an image forming apparatus using the optical scanner.

In order to achieve the above-mentioned objects, there is provided according to one aspect of the present invention an optical element for focusing an optical spot deflected by an optical deflector on a scanned surface in an optical scanner, comprising: a lens having a refractive index distribution, wherein the lens, which serves as one component of an optical system in the optical scanner, is shaped in such a profile that misalignment of a focused position of the optical spot due to the refractive index distribution is corrected for image heights.

According to the above-mentioned invention, it is possible to correct misalignment of a focused position of an optical spot due to a refractive index distribution of an optical element.

In the above-mentioned optical element, the profile of the lens may be designed to correct the misalignment of the focused position of the optical spot due to the refractive index distribution by decreasing a deviation of the misalignment of the focused position of the optical spot with respect to the image heights.

According to the above-mentioned invention, it is possible to correct misalignment of a focused position of an optical spot due to a refractive index distribution of an optical element by most slightly reshaping a metal pattern for molding the optical element.

In the above-mentioned optical element, the lens may be shaped such that a ratio F/W of the deviation F (mm) of the misalignment of the focused position of the optical spot to an effective write width W (mm) scanned by the optical spot is less than or equal to 0.002.

According to the above-mentioned invention, it is possible to provide a sufficient depth margin to an optical spot.

In the above-mentioned optical element, when the lens is configured and arranged to have no refractive index distribution, a focused position of an optical spot from the lens may be located on a positive side of the scanned surface, that is, an opposite side of the scanned surface to the optical deflector.

According to the above-mentioned invention, it is possible to correct misalignment of a focused position of an optical spot due to a refractive index distribution of an optical element by most slightly reshaping a metal pattern for molding the optical element.

In the above-mentioned optical element, the lens may be formed of plastics.

According to the above-mentioned invention, it is possible to reduce fabrication cost of a lens having a sufficient depth margin.

In the above-mentioned optical element, the refractive index distribution of the lens may be more than or equal to $0.5 \times 10^{-6}$ in an effective range of the lens corresponding to an effective write width W (mm) scanned by the optical spot on the scanned surface.

According to the above-mentioned invention, it is possible to reduce fabrication cost of a lens having a sufficient depth margin.

In the above-mentioned optical element, the optical system may further have at least one second optical element, and the lens may have a greater lens thickness deviation, which is defined as $1-D_{min}/D_{max}$ where $D_{max}$ (mm) and $D_{min}$ (mm) are a maximal lens thickness and a minimal lens thickness, respectively, with respect to an optical axis direction for each position of a main scanning direction than any other optical elements included in the optical system.

According to the above-mentioned invention, it is possible to effectively correct misalignment of a focused position of an optical spot due to a refractive index distribution of an optical element.

In the above-mentioned optical element, the lens may be shaped such that the lens thickness deviation is more than or equal to 0.65 in an effective range of the lens corresponding to an effective write width W (mm) scanned by the optical spot on the scanned surface.

According to the above-mentioned invention, it is possible to effectively correct misalignment of a focused position of an optical spot due to a refractive index distribution of an optical element.

In the above-mentioned optical element, the optical system may have at least one second optical element, and the lens may have greater power with respect to a sub-scanning direction than any other optical elements included in the optical system.

According to the above-mentioned invention, it is possible to effectively correct misalignment of a focused position of an optical spot due to a refractive index distribution of an optical element.

Additionally, there is provided according to another aspect of the present invention an optical scanner for optically scanning a scanned surface, comprising: an illuminant emitting an optical beam; an optical deflector deflecting the optical beam; and an optical system focusing the deflected optical beam on the scanned surface as an optical spot, wherein the optical system includes an optical element comprising: a lens having a refractive index distribution, wherein the lens is shaped in such a profile that misalignment of a focused position of the optical spot due to the refractive index distribution is corrected for image heights.

According to the above-mentioned invention, it is possible to provide an optical scanner in which misalignment of a focused position of an optical spot due to a refractive index distribution of an optical element is properly corrected.

Additionally, the optical scanner may further comprise an adjusting part shifting the focused position of the optical spot in an optical axis direction.

According to the above-mentioned invention, it is possible to adjust misalignment of a focused position so as to locate the focused position on a scanned surface for all image heights.

In the above-mentioned optical scanner, the illuminant may be a multi-beam illuminant having a plurality of beam emitting points.

According to the above-mentioned invention, it is possible to increase processing speed and density of an image forming apparatus if the multi-beam illuminant is used in the image forming apparatus. Here, the multi-beam illuminant may be a semiconductor laser array having a plurality of beam emitting points. Also, the multi-beam illuminant may a multi-beam illuminant apparatus having an optical beam synthesizing part for synthesizing a plurality of optical beams emitted by a semiconductor laser array.

Additionally, there is provided according to another aspect of the present invention an optical element for focusing a plurality of optical beams deflected by an optical deflector on a scanned surface in a multi-beam optical scanner as a plurality of optical spots wherein the optical beams are emitted by a multi-beam illuminant having a plurality of beam emitting points, comprising: a lens having a refractive index distribution, wherein the lens, which serves as one component of an optical system in the multi-beam optical scanner, is designed to correct an optical spot pitch deviation on the scanned surface, which is defined as $1-\beta_{min}/\beta_{max}$ where $\beta_{max}$ (μm) and $\beta_{min}$ (μm) are a maximal value and a minimal value of pitches of the optical spots on the scanned surface, respectively, due to the refractive index distribution with respect to image heights.

According to the above-mentioned invention, it is possible to correct an optical spot pitch deviation due to a refractive index distribution of an optical element with respect to image heights.

In the above-mentioned optical element, the optical spot pitch deviation with respect to the image heights may be less than or equal to 0.1.

According to the above-mentioned invention, it is possible to correct an optical spot pitch deviation due to a refractive index distribution of an optical element with respect to image heights by most slightly reshaping a metal pattern of the optical element.

In the above-mentioned optical element, the lens may be formed of plastics.

According to the above-mentioned invention, it is possible to reduce fabrication cost of a lens having a sufficient depth margin.

In the above-mentioned optical element, the refractive index distribution of the lens may be more than or equal to $0.5 \times 10^{-6}$ in an effective range of the lens corresponding to an effective write width W (mm) scanned by each of the optical spots on the scanned surface.

According to the above-mentioned invention, it is possible to reduce fabrication cost of a lens having a sufficient depth margin.

In the above-mentioned optical element, the optical system may have at least one second optical element, and the lens may have A maximal value of a lens thickness deviation, which is defined as $1-D_{min}/D_{max}$ where $D_{max}$ (mm) and $D_{min}$ (mm) are a maximal lens thickness and a minimal lens thickness, respectively, with respect to an optical axis direction for each position of a main scanning direction among lenses included in the optical system.

According to the above-mentioned invention, it is possible to effectively correct an optical spot pitch deviation due to a refractive index distribution of an optical element with respect to image heights.

In the above-mentioned optical element, the lens may be shaped such that the lens thickness deviation is more than or equal to 0.65 in an effective range of the lens corresponding to an effective write width W (mm) scanned by each of the optical spots on the scanned surface.

According to the above-mentioned invention, it is possible to effectively correct an optical spot pitch deviation due to a refractive index distribution of an optical element with respect to image heights.

In the above-mentioned optical element, the optical system may have at least one second optical element, and the lens may have greater power with respect to a sub-scanning direction than any other optical elements included in the optical system.

According to the above-mentioned invention, it is possible to effectively correct an optical spot pitch deviation due to a refractive index distribution of an optical element with respect to image heights.

Additionally, there is provided according to another aspect of the present invention a multi-beam optical scanner for optically scanning a scanned surface, comprising: a multi-beam illuminant emitting a plurality of optical beams, the multi-beam illuminant having a plurality of beam emitting points; an optical deflector deflecting the optical beams; and an optical system focusing the deflected optical beams on the scanned surface as a plurality of optical spots, wherein the optical system has an optical element comprising: a lens having a refractive index distribution, wherein the lens is designed to correct an optical spot pitch deviation on the scanned surface, which is defined as $1-\beta_{min}/\beta_{max}$ where $\beta_{max}$ (µm) and $\beta_{min}$ (µm) are a maximal value and a minimal value of pitches of the optical spots on the scanned surface, respectively, due to the refractive index distribution with respect to image heights.

According to the above-mentioned invention, it is possible to provide an optical scanner in which an optical spot pitch deviation due to a refractive index distribution of an optical element with respect to image heights is properly corrected.

Additionally, there is provided another aspect of the present invention an image forming apparatus for forming an image, comprising: a photosensitive image carrier; an optical scanning part scanning a scanned surface of the photosensitive image carrier so as to form a latent image; and a developing part developing the latent image so as to obtain the image, wherein the optical scanning part is an optical scanner, comprising: an illuminant emitting an optical beam; an optical deflector deflecting the optical beam; and an optical system focusing the deflected optical beam on the scanned surface as an optical spot, wherein the optical system includes an optical element comprising: a lens having a refractive index distribution, wherein the lens is shaped in such a profile that misalignment of a focused position of the optical spot due to the refractive index distribution is corrected for image heights.

Additionally, there is provided according to another aspect of the present invention an image forming apparatus for forming an image, comprising: a photosensitive image carrier; an optical scanning part scanning a scanned surface of the photosensitive image carrier so as to form a latent image; and a developing part developing the latent image so as to obtain the image, wherein the optical scanning part is a multi-beam optical scanner, comprising: a multi-beam illuminant emitting a plurality of optical beams, the multi-beam illuminant having a plurality of beam emitting points; an optical deflector deflecting the optical beams; and an optical system focusing the deflected optical beams on the scanned surface as a plurality of optical spots, wherein the optical system has an optical element comprising: a lens having a refractive index distribution, wherein the lens is designed to correct an optical spot pitch deviation on the scanned surface, which is defined as $1-\beta_{min}/\beta_{max}$ where $\beta_{max}$ (µm) and $\beta_{min}$ (µm) are a maximal value and a minimal value of pitches of the optical spots on the scanned surface, respectively, due to the refractive index distribution with respect to image heights.

According to the above-mentioned inventions, it is possible to provide an image forming apparatus in which misalignment of focused positions of optical spots and an optical spot pitch deviation with respect to image heights are effectively corrected.

Other objects, features and advantages of the present invention will become more apparent from the following detailed description when read in conjunction with the accompanying drawings.

BRIEF DESCRIPTION OF THE DRAWINGS

FIGS. 1A and 1B are diagrams for explaining an example of a refractive index distribution in a conventional plastic lens;

FIG. 5 is a table of coefficients of a surface number 1 of an optical element having no refractive index distribution according to the first embodiment with respect to the main scanning direction and the sub-scanning direction;

FIG. 6 is a table of coefficients of a surface number 2 of the optical element having no refractive index distribution according to the first embodiment with respect to the main scanning direction and the sub-scanning direction;

FIG. 7 is a table of coefficients of a refractive index distribution of an optical element having the refractive index distribution according to the first embodiment;

FIG. 8 is a table of coefficients of a surface number 1 of the optical element according to the first embodiment with respect to the main scanning direction and the sub-scanning direction;

FIG. 9 is a table of coefficients of a surface number 2 of the optical element according to the first embodiment with respect to the main scanning direction and the sub-scanning direction;

FIGS. 10A through 10E are diagrams illustrating focused positions of the optical elements according to the first embodiment with respect to the sub-scanning direction;

FIG. 12 is a table of coefficients of a surface number 1 of an optical element having no refractive index distribution according to the second embodiment with respect to the main scanning direction and the sub-scanning direction;

FIG. 13 is a table of coefficients of a surface number 2 of the optical element having no refractive index distribution according to the second embodiment with respect to the main scanning direction and the sub-scanning direction;

FIG. 14 is a table of coefficients of a surface number 3 of another optical element having no refractive index distribution according to the second embodiment with respect to the main scanning direction and the sub-scanning direction;

FIG. 15 is a table of coefficients of a surface number 4 of the optical element having no refractive index distribution according to the second embodiment with respect to the main scanning direction and the sub-scanning direction;

FIG. 16 is a table of coefficients of a refractive index distribution of an optical element having the refractive index distribution according to the second embodiment;

FIG. 17 is a table of coefficients of a refractive index distribution of another optical element having the refractive index distribution according to the second embodiment;

FIG. 18 is a table of coefficients of a surface number 1 of an optical element having the refractive index distribution according to the second embodiment with respect to the main scanning direction and the sub-scanning direction;

FIG. 19 is a table of coefficients of a surface number 2 of the optical element having the refractive index distribution according to the second embodiment with respect to the main scanning direction and the sub-scanning direction;

FIG. 21 is a table of coefficients of a surface number 3 of an optical element having a refractive index distribution according to a third embodiment of the present invention with respect to the main scanning direction and the sub-scanning direction;

FIG. 22 is a table of coefficients of a surface number 4 of the optical element having the refractive index distribution according to the third embodiment with respect to the main scanning direction and the sub-scanning direction;

FIG. 25 is a table of coefficients of a surface number 1 of an optical element having no refractive index distribution according to the fourth embodiment with respect to the sub-scanning direction;

FIG. 26 is a table of coefficients of a surface number 2 of an optical element having no refractive index distribution according to the fourth embodiment with respect to the sub-scanning direction;

FIG. 27 is a table of coefficients of a refractive index distribution of a lens having a refractive index distribution according to the fourth embodiment;

FIG. 28 is a table of coefficients of a surface number 5 of another lens having a refractive index distribution according to the fourth embodiment;

FIG. 29 is a table of coefficients of a surface number 6 of the lens having the refractive index distribution according to the fourth embodiment;

FIG. 32 is a table of coefficients of a surface number 1 of an optical element having no refractive index distribution according to the fifth embodiment with respect to the main scanning direction and the sub-scanning direction;

FIG. 33 is a table of coefficients of a surface number 2 of the optical element having no refractive index distribution according to the fifth embodiment with respect to the main scanning direction and the sub-scanning direction;

FIG. 34 is a table of coefficients of a surface number 3 of another optical element having no refractive index distribution according to the fifth embodiment with respect to the main scanning direction and the sub-scanning direction;

FIG. 35 is a table of coefficients of a surface number 4 of the optical element having no refractive index distribution according to the fifth embodiment with respect to the main scanning direction and the sub-scanning direction;

FIG. 36 is a table of coefficients of a refractive index distribution of an optical element having the refractive index distribution according to the fifth embodiment;

FIG. 37 is a table of coefficients of a refractive index distribution of another optical element having the refractive index distribution according to the fifth embodiment;

FIG. 38 is a table of coefficients of a surface number 1 of an optical element having the refractive index distribution according to the fifth embodiment with respect to the main scanning direction and the sub-scanning direction;

FIG. 39 is a table of coefficients of a surface number 2 of the optical element having the refractive index distribution according to the fifth embodiment with respect to the main scanning direction and the sub-scanning direction;

FIGS. 40A through 40E are diagrams illustrating focused positions of the optical elements according to the fifth embodiment with respect to the main scanning direction and the sub-scanning direction;

FIG. 41 is a table of coefficients of a surface number 3 of an optical element having a refractive index distribution according to a sixth embodiment of the present invention;

FIG. 42 is a table of coefficients of a surface number 4 of the optical element having the refractive index distribution according to the sixth embodiment of the present invention;

DETAILED DESCRIPTION OF THE PREFERRED EMBODIMENTS

In the following, embodiments of the present invention will be described with reference to the accompanying drawings.

A description will now be given, with reference to FIG. 3, of an optical scanner according to the present invention wherein the optical scanner includes optical elements as mentioned later therein.

Figure 2:
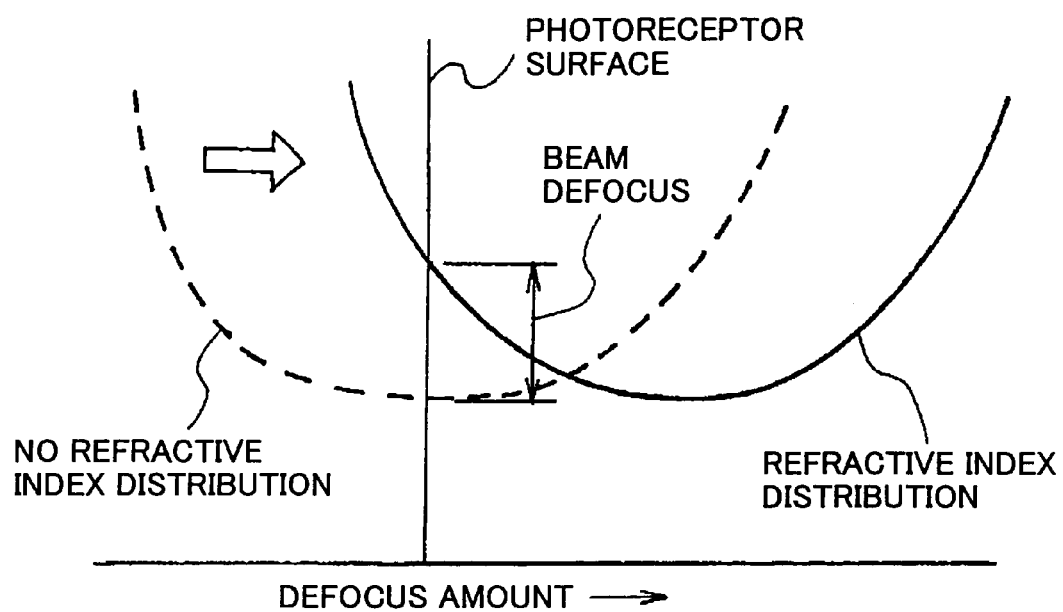
FIG. 2 shows relations between the diameter of an optical spot and beam defocus in two cases where there arises a refractive index distribution and there is no refractive index distribution.
Figure 3:
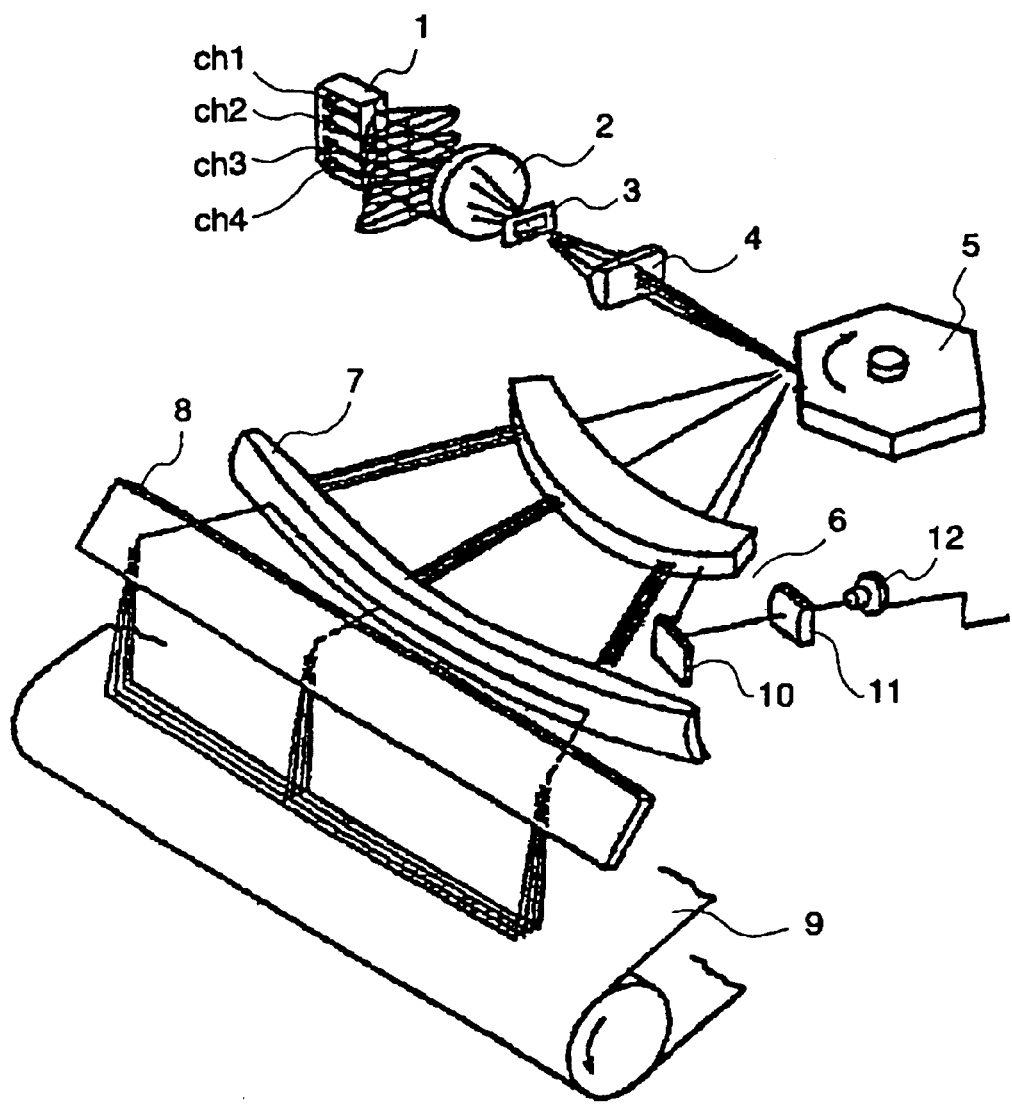
FIG. 3 is a perspective view of substantial parts of an optical scanner according to the present invention.

FIG. 3 is a perspective view of substantial parts of the optical scanner according to the present invention. As shown in FIG. 3, the optical scanner comprises an illuminant 1, a coupling lens 2, an aperture 3, a cylindrical lens 4, a rotating polyhedral mirror (polygon mirror) 5, lenses 6, 7 and 11, a folding mirror 8, a photoreceptor 9, a mirror 10 and a photo acceptor 12.

The optical scanner is a type of a multi-beam optical scanner. A plurality of beam emitting points ch1 through ch4 of the illuminant 1 emit optical beams, and the emitted optical beams are coupled to optical systems in the lower stream by the common coupling lens 2. Corresponding to optical characteristics of the optical systems in the lower stream, the emitted optical beams are converted into a weak-divergent luminous flux, a weak-convergent luminous flux or a parallel luminous flux at this time. When optical beams transmitted through the coupling lens 2 pass an opening of the aperture 3, the optical beams are shaped by cutting off a marginal portion thereof and then the shaped optical beams enter the cylindrical lens 4 serving as a linearly focusing optical system. The cylindrical lens 4 focuses the entering optical beams with respect to the sub-scanning direction so that the optical beams can be focused near a deflection reflection surface of the rotating polyhedral mirror 5 serving as an optical deflector.

The optical beams reflected on the deflection reflection surface of the rotating polyhedral mirror 5 are deflected at a constant angular velocity through constant-speed rotation of the rotating polyhedral mirror 5. Then, the reflected optical beams are transmitted through the two lenses 6 and 7 serving as an image forming optical scanning system. After the optical beams are transmitted, the folding mirror 8 folds optical paths of the transmitted optical beams. The resulting optical beams are focused on the photoconductive photoreceptor 9 serving as a scanned surface as a plurality of optical spots each of which is separated with respect to the sub-scanning direction. These optical spots simultaneously scan a plurality of scan lines.

On the other hand, another stream of the optical beams enters the mirror 10 before the photoreceptor 9 is scanned. The optical beams are focused on the photo receptor 12 by the lens 11. Based on outputs of the photo receptor 12, it is determined when an image begins to be written by scanning the photoreceptor 9. Here, the optical scanner adopts an optical element according to the present invention as both or either of the lenses 6 and 7.

Next, optical elements according to the present invention will be described in detail by using some embodiments. In the following embodiments, the optical elements have a profile of a lens surface and other factors thereof defined as follows.

Regarding a non-arc shape of the lens surface in a cross-section with respect to the main scanning direction, a paraxial curvature radius of the lens surface in the cross-section with respect to the main scanning direction is notated as Rm, a distance from the optical axis with respect to the main scanning direction as Y, a cone constant as Km, high-order coefficients as A1, A2, A3, A4, A5, A6, . . . , and a depth with respect to the optical axis direction as X. Then, the following polynomial expression is satisfied;

$$X = \frac{Y^2/R_m}{1+\sqrt{1-(1+K_m)(Y/R_m)^2}} + A_1 \cdot Y + A_2 \cdot Y^2 + A_3 \cdot Y^3 + A_4 \cdot Y^4 + A_5 \cdot Y^5 + A_6 \cdot Y^6 + \ldots . \quad (1)$$

In the expression (1), if non-zero values are substituted for the odd-order coefficients A1, A3, A5, . . . , the lens surface has an asymmetric shape with respect to the main scanning direction.

Regarding a curvature of the lens surface in a cross-section with respect to the sub-scanning direction, if the curvature in the sub-scanning directional cross-section varies in the main scanning direction, which is represented as a coordinate Y in a case where the optical axis position is set as an origin of the coordinate, the curvature Cs(Y) in the cross-section with respect to the sub-scanning direction is represented as follows;

$$Cs(Y) = \frac{1}{R_s(O)} + B_1 \cdot Y + B_2 \cdot Y^2 + B_3 \cdot Y^3 + B_4 \cdot Y^4 + B_5 \cdot Y^5 + B_6 \cdot Y^6 + \cdots , \quad (2)$$

where Rs(0) is a curvature radius on the optical axis in the cross-section with respect to the sub-scanning direction, and B1, B2, B3, B4, B5, B6, . . . , are high-order coefficients. In the expression (2), if non-zero values are substituted for the odd-order coefficients B1, B3, B5, . . . , the curvature in the sub-scanning directional cross-section varies asymmetrically in the main scanning direction.

Regarding a minor non-arc surface, that is, a surface that has a non-arc shape on a sub-scanning directional cross-section such that the non-arc shape varies in accordance with positions thereof in the sub-scanning directional cross-sec tion with respect to the main scanning direction, the minor non-arc surface X is represented as follows;

$$X = \frac{Y^2/R_m}{1+\sqrt{1-(1+K_m)(Y/R_m)^2}} + A_1 \cdot Y + A_2 \cdot Y^2 + A_3 \cdot Y^3 + \quad (3)$$

$$A_4 \cdot Y^4 + A_5 \cdot Y^5 + A_6 \cdot Y^6 + \ldots + \frac{C_s \cdot Z^2}{1+\sqrt{1-(1+K_s)(C_s \cdot Z)^2}} +$$

$$(F_0 + F_1 \cdot Y + F_2 \cdot Y^2 + F_3 \cdot Y^3 + F_4 \cdot Y^4 + \ldots) \cdot Z +$$

$$(G_0 + G_1 \cdot Y + G_2 \cdot Y^2 + G_3 \cdot Y^3 + G_4 \cdot Y^4 + \ldots) \cdot Z^2 +$$

$$(H_0 + H_1 \cdot Y + H_2 \cdot Y^2 + H_3 \cdot Y^3 + H_4 \cdot Y^4 + \ldots) \cdot Z^3 +$$

$$(I_0 + I_1 \cdot Y + I_2 \cdot I^2 + I_3 \cdot Y^3 + I_4 \cdot Y^4 + \ldots) \cdot Z^4 +$$

$$(J_0 + J_1 \cdot Y + J_2 \cdot Y^2 + J_3 \cdot Y^3 + J_4 \cdot Y^4 + \ldots) \cdot Z^5 +$$

$$(K_0 + K_1 \cdot Y + K_2 \cdot Y^2 + K_3 \cdot Y^3 + K_4 \cdot Y^4 + \ldots) \cdot Z^6 +$$

$$(L_0 + L_1 \cdot Y + L_2 \cdot Y^2 + L_3 \cdot Y^3 + L_4 \cdot Y^4 + \ldots) \cdot Z^7 +$$

$$(M_0 + M_1 \cdot Y + M_2 \cdot Y^2 + M_3 \cdot Y^3 + M_4 \cdot Y^4 + \ldots) \cdot Z^8 +$$

$$(N_0 + N_1 \cdot Y + N_2 \cdot Y^2 + N_3 \cdot Y^3 + N_4 \cdot Y^4 + \ldots) \cdot Z^9$$

$$\vdots \, ,$$

where Y is a coordinate of the lens surface in the sub-scanning directional cross-section with respect to the main scanning direction, and Z is a coordinate thereof with respect to the sub-scanning direction.

In the expression (3), Cs represents Cs(Y) defined in the expression (2), and Ks is defined as follows;

$$Ks = Ks(0) + C1 \cdot Y + C2 \cdot Y^2 + C3 \cdot Y^3 + C4 \cdot Y^4 + C5 \cdot Y^5 + \ldots \quad (4).$$

In the expression (3), if non-zero values are substituted for the odd-order coefficients F1, F3, F5, . . . , and G1, G3, G5, . . . , an amount of the non-arc in the sub-scanning directional cross-section becomes asymmetric.

As mentioned above, the minor non-arc surface is defined as a surface that has a non-arc shape in a sub-scanning directional cross-section such that the non-arc shape varies in accordance with positions thereof in the sub-scanning directional cross-section with respect to the main scanning direction. In the expression (3), the first line of the right-hand side is a function of only the coordinate Y with respect to the main scanning direction and represents a shape in the main scanning directional cross-section. In the remaining lines of the right-hand side, that is, the lines below the second line, when the Y coordinate in the sub-scanning directional cross-section is determined, the coefficients of each order of Z are uniquely determined. Therefore, it is possible to determine the non-arc shape of the lens surface in the sub-scanning directional cross-section.

Here, an analytical expression regarding the surface shape is not limited to the above-mentioned expression. Other expressions may be possible. Namely, the surface shape according to the present invention is not limited to the above expression.

Regarding a refractive index distribution, if a lens contains a refractive index distribution n, the refractive index distribution n can be represented as follows;

$$n = n_0 + a_0 + a_1 \cdot Y + a_2 \cdot Y^2 + a_3 \cdot Y^3 + a_4 \cdot Y^4 + \cdots + \quad (5)$$

$$(b_0 + b_1 \cdot Y + b_2 \cdot Y^2 + b_3 \cdot Y^3 + b_4 \cdot Y^4 + \cdots) \cdot Z +$$

$$(c_0 + c_1 \cdot Y + c_2 \cdot Y^2 + c_3 \cdot Y^3 + c_4 \cdot Y^4 + \cdots) \cdot Z +$$

$$(d_0 + d_1 \cdot Y + d_2 \cdot Y^2 + d_3 \cdot Y^3 + d_4 \cdot Y^4 + \cdots) \cdot Z +$$

$$(e_0 + e_1 \cdot Y + e_2 \cdot Y^2 + e_3 \cdot Y^3 + e_4 \cdot Y^4 + \cdots) \cdot Z$$

$$\vdots \, ,$$

where $n_0$ is a reference refractive index distribution.

A description will now be given, with reference to FIG. 4 through FIG. 10, of an optical element according to the first embodiment of the present invention.

Figure 4:
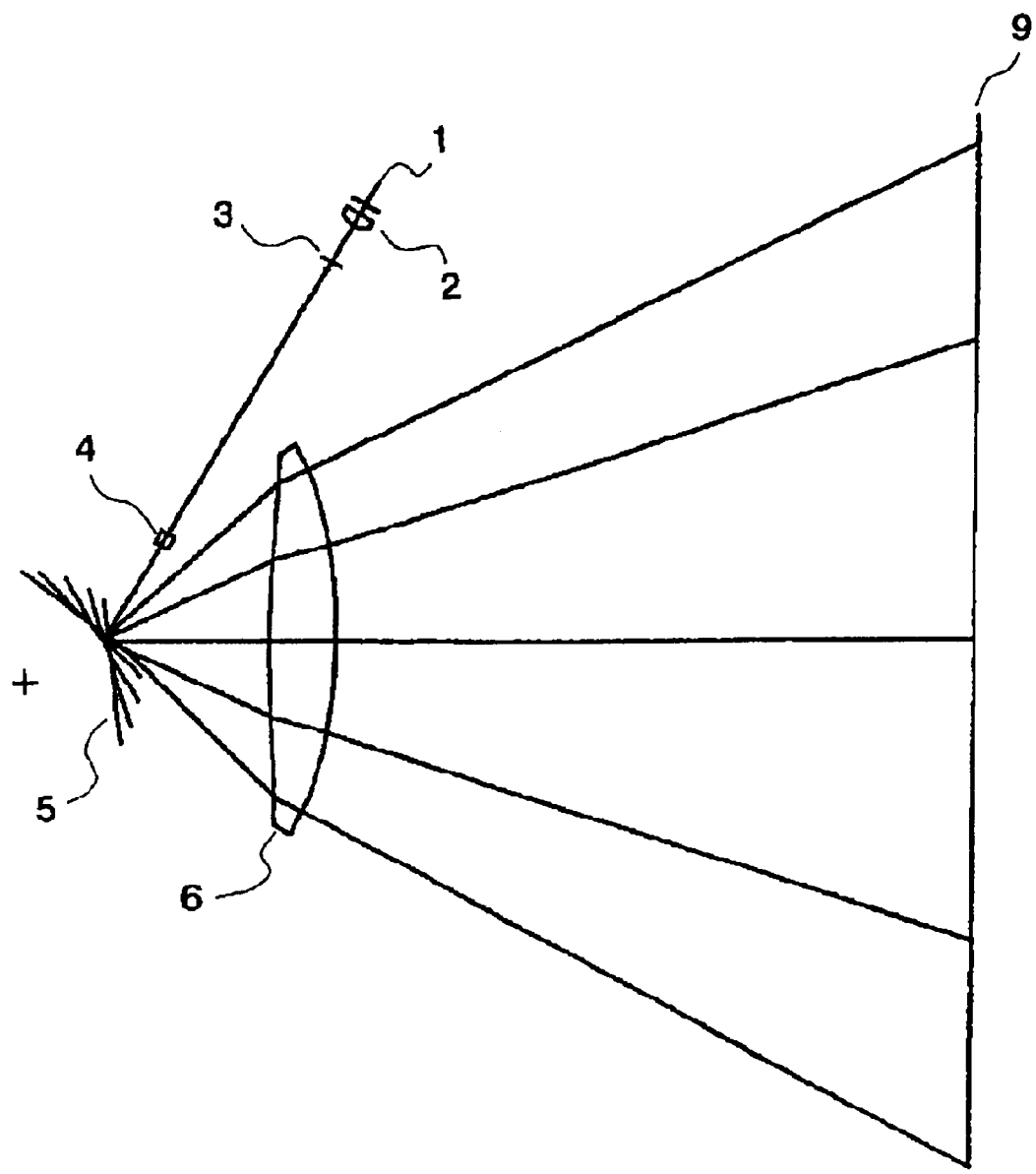
FIG. 4 is a diagram for explaining an optical scanning system including an image forming scanner lens being an optical element according to a first embodiment of the present invention.

FIG. 4 is a diagram for explaining an optical scanning system including an image forming scanner lens being the optical element according to the first embodiment. FIG. 5 and FIG. 6 are tables of coefficients of individual surfaces of the optical element without a refractive index distribution with respect to the main scanning direction and the sub-scanning direction. FIG. 7 is a table of coefficients of a refractive index distribution of the optical element with the refractive index distribution according to the first embodiment of the present invention. FIG. 8 and FIG. 9 are tables of individual surfaces of the optical element with the refractive index distribution according to the first embodiment with respect to the main scanning direction and the sub-scanning direction. FIGS. 10A through 10E show focused positions of the optical element according to the first embodiment with respect to the main scanning direction and the sub-scanning direction. In FIG. 4, the same parts as those in FIG. 3 are designated by the same reference numerals, and the optical element according to the first embodiment is used as the lens 6.

An optical scanner in FIG. 4 has components as follows.
Illuminant 1
number of beam emitting points: 1
wavelength: 780 nm
Coupling lens 2
focal distance: 8 mm (one illuminant by one lens)
coupling behavior: convergence
Cylindrical lens 4
focal distance with respect to the sub-scanning direction: 26.47 mm
Polygon mirror 5
number of deflection reflection surfaces: 6
radius of the inscribed circle: 18 mm
Angle between an incident beam from the illuminant side to the polygon mirror and the optical axis of an image forming optical scanning system: 60°
Data regarding optical systems between the polygon mirror and a scanned surface

TABLE 1

| | surface number | Rmi | Rsi (0) | X | Y | n |
|---|---|---|---|---|---|---|
| deflection reflection surface | 0 | ∞ | ∞ | 33.21 | 0.36 | |
| lens 6 | 1 | 160.43 | −98.8 | 13.5 | 0 | 1.52441 |
| | 2 | −141.27 | −15.25 | 128.29 | 0 | |

In the above data table 1, the surface number 0 is a deflection reflection surface of the polygon mirror 5, the surface number 1 is a surface of the deflection reflection surface side of the lens 6, and the surface number 2 is the opposite surface of the deflection reflection surface side of the lens 6, and Rm and Rs are paraxial curvature radiuses if the optical systems are not arc-shaped. The value Y of the surface number 0 represents a difference between a reflection point at the time when an optical beam entering the deflection reflection surface reaches a reference image height of 0 and a paraxial position of the surface number 1 with respect to the main scanning direction. For the surface number n (n≧1), the value Y represents a difference between a paraxial position of the surface number n and a paraxial position of the surface number (n+1) with respect to the main scanning direction.

Under the above component condition, it is supposed that the lens 6 is formed of a material without a refractive index distribution such as glass. FIG. 5 and FIG. 6 show coefficients of the surface numbers 1 and 2, respectively, with respect to the main scanning direction and the sub-scanning direction in a case where the lens 6 is optimally designed.

Here, it is assumed that a lens without any refractive index distribution such as a glass lens is manufactured based on the data in FIG. 5 and FIG. 6, and then focused positions of the lens are measured with respect to the sub-scanning direction. FIG. 10A shows the focused positions of the lens with respect to the sub-scanning direction. In this case, the ratio F/W, that is, the ratio of a deviation F of the focused positions with respect to image heights to an effective write width W on the scanned surface scanned by an optical spot transmitted through the lens, is as follows;

$F/W = 0.103$ mm/210 mm=0.0005≦0.002.

On the other hand, an optical scanner lens is manufactured by plastic molding based on the data in FIG. 5 and FIG. 6, and then a refractive index distribution thereof is measured. From the measurement, it is found that the refractive index distribution $\delta_n = 2.0 \times 10^{-4}$ ($0.5 \times 10^{-6} \leq \delta_n \leq 5.0 \times 10^{-4}$). FIG. 7 shows coefficients of this refractive index distribution.

FIG. 10B shows focused positions of the optical scanner lens with respect to the sub-scanning direction. In this case, the ratio F/W is as follows;

$F/W = 1.544$ mm/210 mm=0.0074.

Namely, the ratio F/W is above the desirable bound 0.002.

In order to correct misalignment of the focused positions for image heights, sub-scanning directional coefficients of the optical element according to the first embodiment are determined for each surface thereof. FIG. 8 and FIG. 9 show the determined coefficients. An optical scanner lens according to the first embodiment is manufactured in plastic molding based on the data in FIG. 8 and FIG. 9, and then focused positions of the optical scanner lens are measured with respect to the sub-scanning direction. FIG. 10C shows the measured focused positions of the optical scanner lens according to the first embodiment with respect to the sub-scanning direction. In this case, the ratio F/W is as follows;

$F/W = 0.084$ mm/210 mm=0.0003≦0.002.

As seen in FIG. 10C, the focused positions with respect to the sub-scanning direction are located away from the scanned surface at about 4.6 mm. In order to set the focused positions on the scanned surface, the cylindrical lens 4 is shifted by −0.6 mm in the optical axis direction. FIG. 10E shows the resulting focused positions with respect to the sub-scanning direction.

Here, if it is supposed that the optical scanner lens has no refractive index distribution under the coefficients in FIG. 8 and FIG. 9, the focused positions of the sub-scanning direction are located as shown in FIG. 10D. As seen in FIG. 10D, the focused positions are on the positive side of the scanned surface.

A description will now be given, with reference to FIG. 11 through FIG. 20, of an optical element according to the second embodiment of the present invention.

Figure 11:
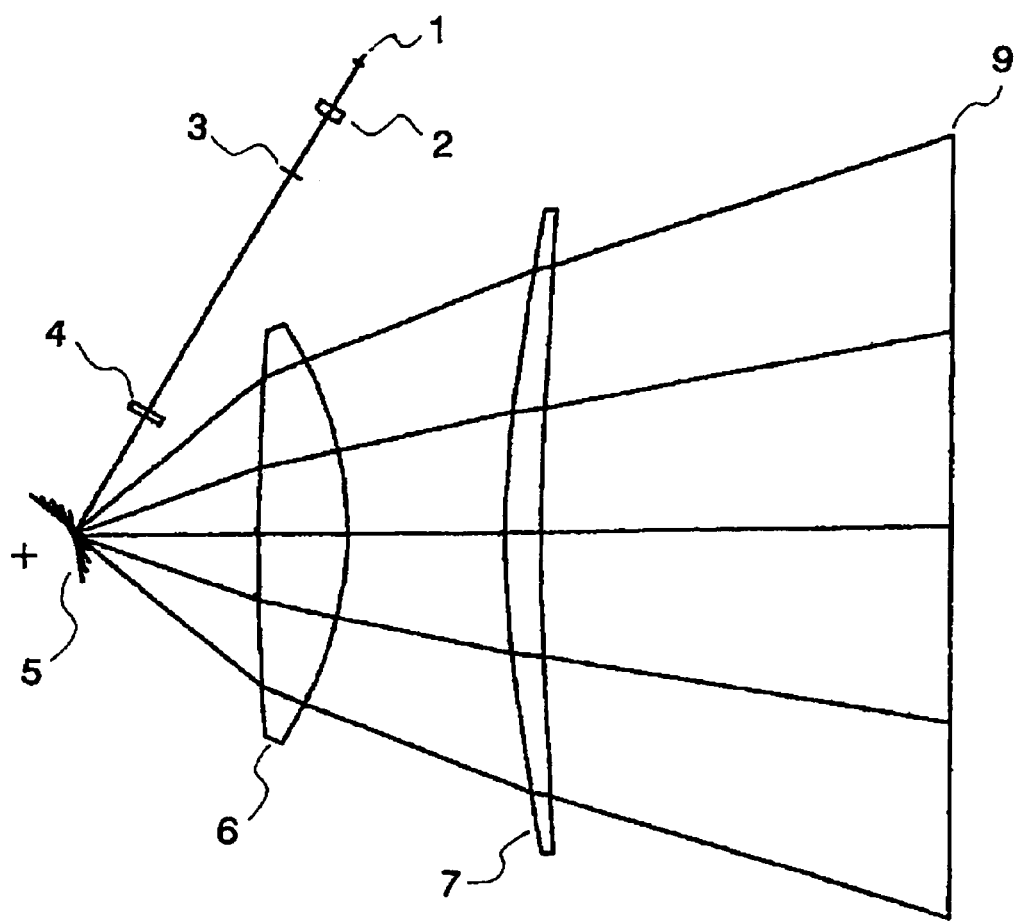
FIG. 11 is a diagram for explaining an optical scanning system including an image forming scanner lens being an optical element according to a second embodiment of the present invention.

FIG. 11 is a diagram for explaining an optical scanning system including an image forming scanner lens being the optical element according to the second embodiment. FIG. 12 through FIG. 15 show coefficients of optical elements having no refractive index distribution according to the second embodiment with respect to the main scanning direction and the sub-scanning direction for each surface thereof. FIG. 16 and FIG. 17 are tables of refractive index distributions of lenses 6 and 7, respectively, having the refractive index distributions according to the second embodiment. FIG. 18 and FIG. 19 are tables of coefficients of the lens 6 with respect to the main scanning direction and the sub-scanning direction for each surface thereof. FIGS. 20A through 20E show focused positions of the optical elements according to the second embodiment with respect to the main scanning direction and the sub-scanning direction. In FIG. 11, a lens 7 is provided in addition to the parts in FIG. 3, and the lenses 6 and 7 are the optical elements according to the second embodiment.

An optical scanner in FIG. 11 has components as follows.
Illuminant 1
number of beam emitting points: 4 (laser diode array)
pitch between the beam emitting points: 14 μm
wavelength: 780 nm
Coupling lens 2
focal distance: 27 mm (one illuminant by one lens)
coupling behavior: collimation
Cylindrical lens 4
focal distance with respect to the sub-scanning direction: 58.7 mm
Polygon mirror 5
number of deflection reflection surfaces: 5
radius of the inscribed circle: 20 mm
Angle between an incident beam from the illuminant side to the polygon mirror 5 and the optical axis of an image forming optical scanner system: 60°
Data regarding optical systems between the polygon mirror 5 and the scanned surface 9

TABLE 2

| | surface number | Rmi | Rsi (0) | X | Y | n |
|---|---|---|---|---|---|---|
| deflection reflection surface | 0 | ∞ | ∞ | 72.56 | 0.406 | |
| lens 6 | 1 | 1616.43 | −50.14 | 35 | 0 | 1.52398 |
| | 2 | −146.51 | −199.81 | 61.93 | 0 | |
| lens 7 | 3 | 400.87 | −72.03 | 14 | 0 | 1.52398 |
| | 4 | 824.88 | −27.59 | 160.56 | 0 | |

The data of the optical systems between the polygon mirror and the scanned surface are represented in the table 2. In the table 2, the surface number 0 is a deflection reflection surface of the polygon mirror 5, the surface number 1 is a surface of the reflection deflection surface side of the lens 6, the surface number 2 is the opposite surface of the reflection deflection surface side of the lens 6, the surface number 3 is a surface of the reflection deflection surface side of the lens 7, and the surface number 4 is the opposite surface of the reflection deflection surface side of the lens 7.

Figure 20A:
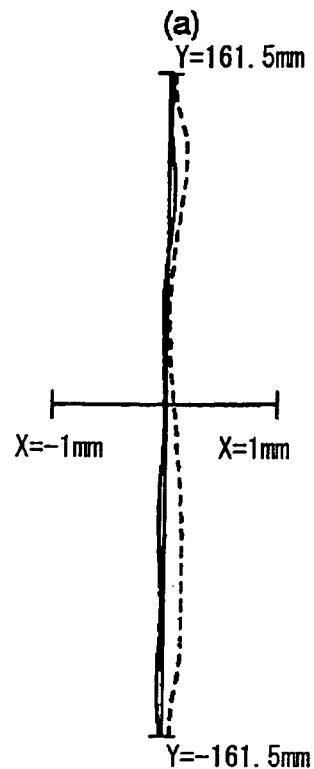
FIGS. 20A through 20E are diagrams illustrating focused positions of the optical elements according to the second embodiment with respect to the main scanning direction and the sub-scanning direction.

A case where the lenses 6 and 7 are formed of a material without a refractive index distribution such as a glass is considered. FIG. 12 through FIG. 15 show coefficients of the lenses 6 and 7 with respect to the main scanning direction and the sub-scanning direction for each surface thereof under optimal design of the lenses 6 and 7. A lens having no refractive index distribution such as a glass lens is manufactured based on the data in FIG. 12 through FIG. 15, and then focused positions thereof are measured with respect to the sub-scanning direction. FIG. 20A shows the measured focused positions of the lens with respect to the main scanning direction and the sub-scanning direction. In FIGS. 20A through 20E, the dotted curves represent focused positions of lenses with the main scanning direction and the solid curves represent the focused positions thereof with respect to the sub-scanning direction.

The manufactured lens has F(main)/W and F(sub)/W ratios with respect to the main scanning direction and the sub-scanning direction, respectively, as follows;

$F(\text{main})/W = 0.133 \text{ mm}/323 \text{ mm} = 0.0004 \leq 0.002$, and $F(\text{sub})/W = 0.099 \text{ mm}/323 \text{ mm} = 0.0003 \leq 0.002$.

Namely, the lens having no refractive index distribution meets the bound 0.002 with respect to both scanning directions.

On the other hand, the lenses 6 and 7 are manufactured in plastic molding based on the same data in FIG. 12 through FIG. 15, and then refractive index distributions thereof are measured. The manufactured lens 6 has the refractive index distribution $\delta_n = 1.84 \times 10^{-5}$ for a width of 4 mm with respect to the sub-scanning direction, and the manufactured lens 7 has the refractive index distribution $\delta n = 2.1 \times 10^{-5}$ for a width of 8 mm with respect to the sub-scanning direction ($0.5 \times 10^{-6} \leq \delta_n \leq 5.0 \times 10^{-4}$). FIG. 16 and FIG. 17 show coefficients of the refractive index distributions of the lenses 6 and 7.

Figure 20B:
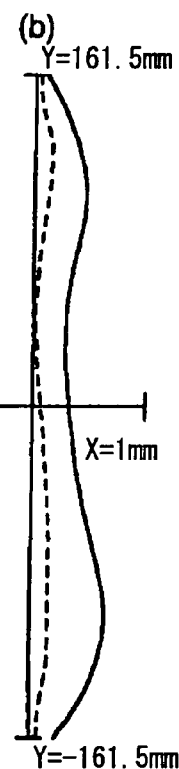

FIG. 20B shows focused positions thereof with respect to the main scanning direction and the sub-scanning direction. Here, the lenses have the ratios of F(main)/W and F(sub)/W with respect to the main scanning direction and the sub-scanning direction as follows;

$F(\text{main})/W = 0.133 \text{ mm}/323 \text{ mm} = 0.0004$, and $F(\text{sub})/W = 0.765 \text{ mm}/323 \text{ mm} = 0.0024$.

As seen in the above expression, the ratio F(sub)/W is above the bound 0.002.

Figure 20C:
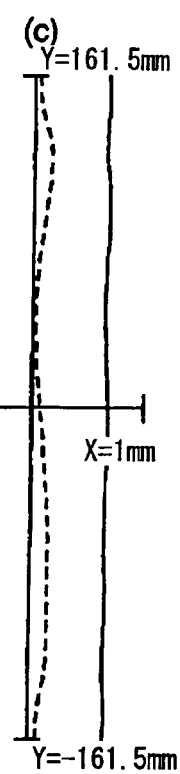
Figure 20D:
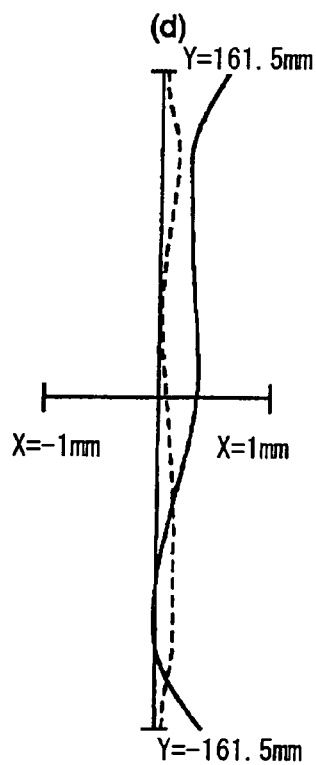

In order to correct misalignment of focused positions for image heights, coefficients of the optical element according to the second embodiment with respect to the sub-scanning direction are determined for each surface of the lens 6. FIG. 18 and FIG. 19 show the determined coefficients to correct the focused position misalignment. In particular, the lens 6 is noticed because the lens 6 has a thickness of the largest deviation of 0.66 ($\geq 0.65$) in an effective range. An optical scanner lens is manufactured in plastic molding based on the data in FIG. 18 and FIG. 19, and then focused positions of the lens are measured with respect to the sub-scanning direction. FIG. 20C shows the focused positions thereof with respect to the main scanning direction and the sub-scanning direction. In this case, the optical scanner lens has the ratios F(main)/W and F(sub)/W as follows;

$F(\text{main})/W = 0.133 \text{ mm}/323 \text{ mm} = 0.0004 \leq 0.002$, and $F(\text{sub})/W = 0.036 \text{ mm}/323 \text{ mm} = 0.0001 \leq 0.002$.

Figure 20E:
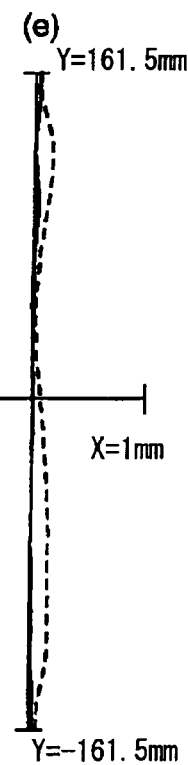

At this time, the focused positions with respect to the sub-scanning direction are located away from the scanned surface 9 at about 0.67 mm. In order to set the focused positions on the scanned surface 9, the cylindrical lens 4 is shifted by −1.4 mm in the optical axis direction. FIG. 20E shows the resulting focused positions with respect to the main scanning direction and the sub-scanning direction. In this case, the focused positions have a deviation of 0.048 of pitches of optical spots with respect to image heights. Therefore, the deviation becomes less than 0.1.

Here, if it is supposed that the optical scanner lens in accordance with the coefficients in FIG. 18 and FIG. 19 has no refractive index distribution, the focused positions of the optical scanner lens having no refractive index distribution are located with respect to the main scanning direction and the sub-scanning direction as shown in FIG. 20E, that is, the focused positions are located in the positive side of the scanned surface 9.

A description will now be given, with reference to FIG. 21 through FIG. 23, of an optical element according to the third embodiment of the present invention.

Figure 23A:
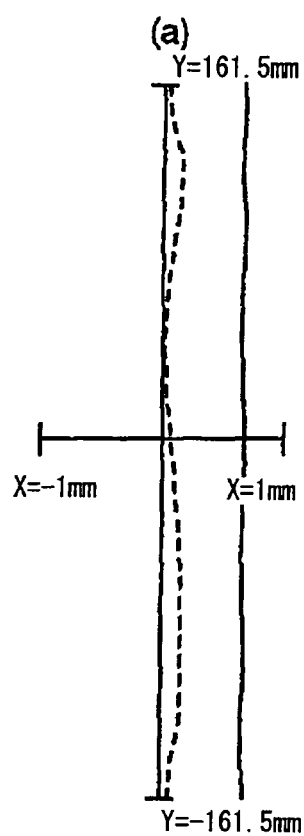
FIGS. 23A through 23C are diagrams illustrating focused positions of the optical elements according to the third embodiment with respect to the main scanning direction and the sub-scanning direction.
Figure 23B:
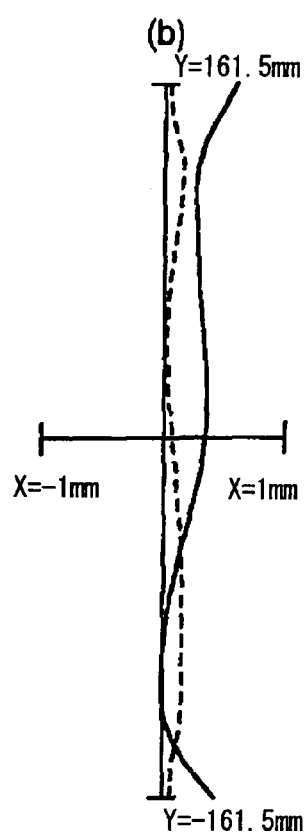
Figure 23C:
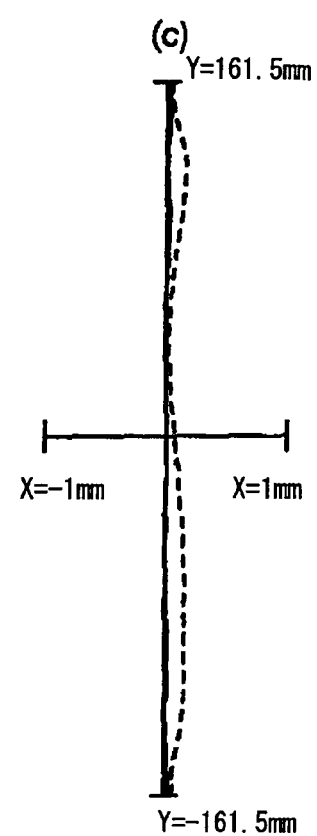

FIG. 21 and FIG. 22 show coefficients of an optical element having a refractive index distribution according to the third embodiment with respect to the sub-scanning direction for each surface thereof. FIGS. 23A through 23C show focused positions of the optical element according to the third embodiment with respect to the main scanning direction and the sub-scanning direction.

An optical scanning system according to the third embodiment is fundamentally similar to the optical scanning system including an image forming scanner lens being the optical element according to the second embodiment. The optical scanning system differs from the optical scanning system according to the second embodiment in that coefficients of the lens 7 with respect to the sub-scanning direction are determined for each surface thereof so that misalignment of focused positions due to refractive index distributions of the lenses 6 and 7 can be corrected for each image height. FIG. 21 and FIG. 22 show the determined coefficients. Here, the lens 7 is especially noticed because the lens 7 has the greatest power with respect to the sub-scanning direction. FIG. 23A shows focused positions of the lens 7 with respect to the main scanning direction and the sub-scanning direction. The lens 7 has the ratios F(main)/W and F(sub)/W with respect to the main scanning direction and the sub-scanning direction as follows;

$F(\text{main})/W = 0.133 \text{ mm}/323 \text{ mm} = 0.0004 \leq 0.002$, and $F(\text{sub})/W = 0.027 \text{ mm}/323 \text{ mm} = 0.00008 \leq 0.002$.

As shown in FIG. 23A, the focused positions thereof with respect to the sub-scanning direction are located away from the scanned surface 9 by about 0.67 mm. In order to set the focused positions on the scanned surface 9, the cylindrical lens 4 is shifted in the optical axis direction by −1.4 mm. FIG. 23C shows the resulting focused positions thereof with respect to the main scanning direction and the sub-scanning direction. At this time, the lens 7 has a deviation of 0.047 of pitches of optical spots thereof with respect to image heights. Therefore, the deviation becomes less than 0.1.

Here, if it is supposed that a lens in accordance with the coefficients has no refractive index distribution, focused positions of the lens with respect to the main scanning direction and the sub-scanning direction are located as shown in FIG. 23B, that is, the focused positions thereof are located in the positive side of the scanned surface 9.

A description will now be given, with reference to FIG. 24 through FIG. 30, of an optical element according to the fourth embodiment of the present invention.

Figure 24:
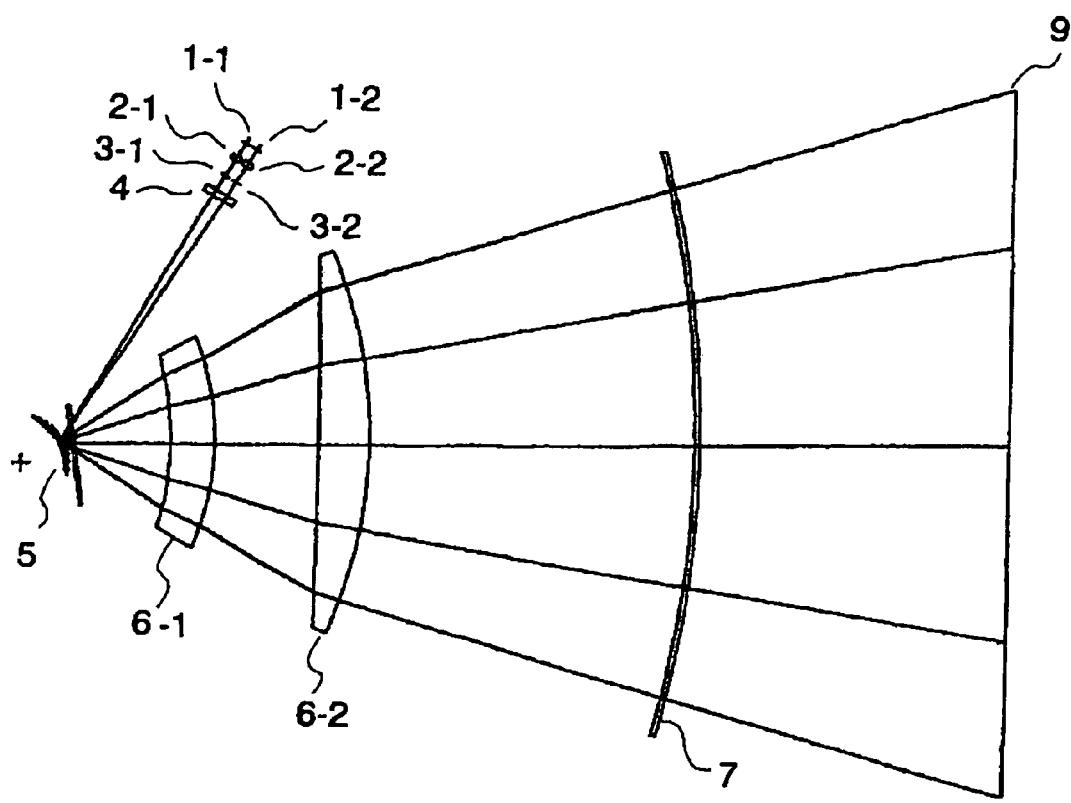
FIG. 24 is a diagram for explaining an optical scanning system including an image forming scanner lens being an optical element according to a fourth embodiment of the present invention.

FIG. 24 is a diagram for explaining an optical scanning system including an image forming scanner lens being the optical element according to the fourth embodiment. FIG. 25 and FIG. 26 show coefficients of each surface of an optical element 6-1 having no refractive index distribution according to the fourth embodiment with respect to the sub-scanning direction. FIG. 27 shows coefficients of a refractive index distribution of the optical element 6-1 having the refractive index distribution according to the fourth embodiment. FIG. 28 and FIG. 29 show coefficients of each surface of an optical element 7 having a refractive index distribution according to the fourth embodiment with respect to the sub-scanning direction. FIGS. 30A through 30E show focused positions of the optical elements according to the fourth embodiment with respect to the main scanning direction and the sub-scanning direction. In FIG. 24, lenses 6-1, 6-2 and 7 are optical elements according to the fourth embodiment, and the other reference numerals are the same as those in FIG. 3.

An optical scanner in FIG. 24 has components as follows.

Illuminant 1 number of beam emitting points: 2 (2 laser diodes fashion)

wavelength: 650 nm

Coupling lens 2 focal distance: 15 mm (one illuminant by one lens)

coupling behavior: collimation

Cylindrical lens 4 focal distance with respect to the sub-scanning direction: 177.76 mm

Polygon mirror 5 number of deflection reflection surfaces: 6 radius of the inscribed circle: 25 mm

Angle between an incident beam from the illuminant side to the polygon mirror 5 and the optical axis of an image forming optical scanning system: 60°

Data of optical systems between the polygon mirror 5 and the scanned surface 9

TABLE 3

| | surface number | Rmi | Rsi (0) | X | Y | n |
|---|---|---|---|---|---|---|
| deflection reflection surface | 0 | ∞ | ∞ | 65.8 | 1.388 | |
| lens 6-1 | 1 | −183.66 | −205.15 | 25.73 | 0 | 1.57915 |
| | 2 | −170.98 | −154.63 | 61.35 | 0 | |
| lens 6-2 | 3 | −5298.5 | −5298.5 | 30 | 0 | 1.71834 |
| | 4 | −299.48 | −299.48 | 192.6 | 0 | |
| lens 7 | 5 | −700 | −110.45 | 3 | 0 | 1.57915 |
| | 6 | −700 | −45.65 | 182.28 | 0 | |

The table 3 represents the data of the optical systems between the polygon mirror 5 and the scanned surface 9, that is, the lenses 6-1, 6-2 and 7. Here, the surface number 0 is a deflection reflection surface of the polygon mirror 5, the surface number 1 is a surface of the deflection reflection side of the lens 6-1, the surface number 2 is the opposite surface of the deflection reflection side of the lens 6-1, the surface number 3 is a surface of the deflection reflection side of the lens 6-2, the surface number 4 is the opposite surface of the deflection reflection side of the lens 6-2, the surface number 5 is a surface of the deflection reflection side of the lens 7, the surface number 6 is the opposite surface of the deflection reflection side of the lens 7.

In the fourth embodiment, among the lenses 6-1, 6-2 and 7 as the optical scanner systems, the lenses 6-1 and 7 are formed in plastic molding. The lens 6-1 has surfaces, whose curvature thereof in a sub-scanning cross-section varies asymmetrically with respect to the main scanning direction, as represented in the expression (2). FIG. 25 and FIG. 26 show coefficients of each surface of the lens 6-1 with respect to the sub-scanning direction.

Figure 30A:
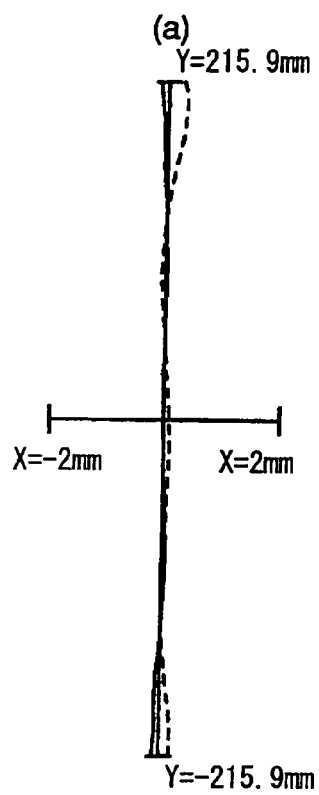
FIGS. 30A through 30E are diagrams illustrating focused positions of the optical elements according to the fourth embodiment with respect to the main scanning direction and the sub-scanning direction.

When the lens 6-1 is formed of a material without a refractive index distribution such as glass under optimal design thereof, the lens 6-1 has the coefficients as shown in FIG. 25 and FIG. 26. Here, a lens having no refractive index distribution is manufactured based on the data in FIG. 25 and FIG. 26, and then focused positions thereof are measured with respect to the sub-scanning direction. FIG. 30A shows the measured focused positions thereof with respect to the main scanning direction and the sub-scanning direction. In FIG. 30A through FIG. 30E, the dotted curves represent focused positions with respect to the main scanning direction, and the solid curves represent focused positions with respect to the sub-scanning direction. The manufactured lens having no refractive index distribution has the ratios F(main)/W and F(sub)/W with respect to the main scanning direction and the sub-scanning direction as follows;

$F(\text{main})/W=0.372$ mm/431.8 mm=0.0009 $\leq$ 0.002, and $F(\text{sub})/W=0.201$ mm/431.8 mm=0.0005 $\leq$ 0.002.

On the other hand, an optical scanner lens 6-1 is manufactured in plastic molding based on the same data in FIG. 25 and FIG. 26, and a refractive index distribution thereof is measured. From the measurement, it is observed that the lens 6-1 has a refractive index distribution $\delta_n=3.64\times10^{-5}$ for a width of 4 mm with respect to the sub-scanning direction $(0.5\times10^{-6}\leq\delta_n\leq5.0\times10^{-4})$. FIG. 27 shows coefficients of the refractive index distribution of the lens 6-1.

Figure 30B:
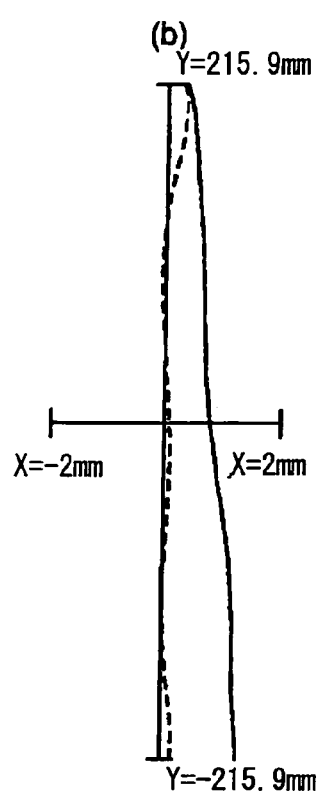

FIG. 30B shows focused positions of the lens 6-1 with respect to the main scanning direction and the sub-scanning direction. The lens 6-1 has the ratios F(main)/W and F(sub)/W with respect to the main scanning direction and the sub-scanning direction as follows;

$F(\text{main})/W=0.372$ mm/431.8 mm=0.0009, and $F(\text{sub})/W=0.959$ mm/431.8 mm=0.0022.

Namely, the ratio F(sub)/W is above the upper bound 0.002.

In order to correct this misalignment of the focused positions for each image height, coefficients of each surface of the lens 7 are determined with respect to the sub-scanning direction. FIG. 28 and FIG. 29 show the determined coefficients. The lens 7 is noticed here because the lens 7 has the greatest power with respect to the sub-scanning direction.

Figure 30C:
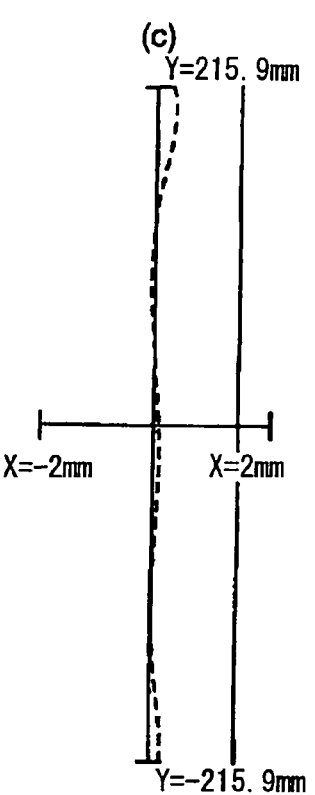

FIG. 30C shows focused positions of the lens 7 with respect to the main scanning direction and the sub-scanning direction. Here, the lens 7 has the ratios F(main)/W and F(sub)/W with respect to the main scanning direction and the sub-scanning direction as follows;

$F(\text{main})/W=0.372$ mm/431.8 mm=0.0009 $\leq$ 0.002 and $F(\text{sub})/W=0.011$ mm/431.8 mm=0.00003 $\leq$ 0.002.

In this case, the focused positions of the lens 7 are located away from the scanned surface 9 by about 1.4 mm with respect to the sub-scanning direction. In order to set the focused positions on the scanned surface 9, it is necessary to shift the cylindrical lens 4 in the optical axis direction by −3.2 mm. FIG. 30E shows the resulting focused positions thereof with respect to the main scanning direction and the sub-scanning direction. In this case, the lens 7 has a deviation of 0.073 of pitches of optical spots with respect to image heights, and the deviation meets an upper bound of 0.1.

Figure 30D:
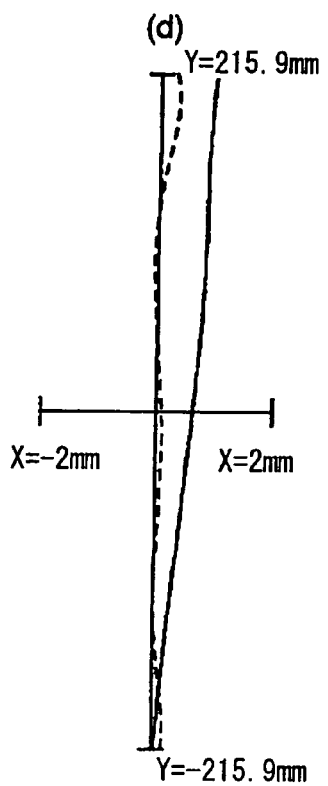
Figure 30E:
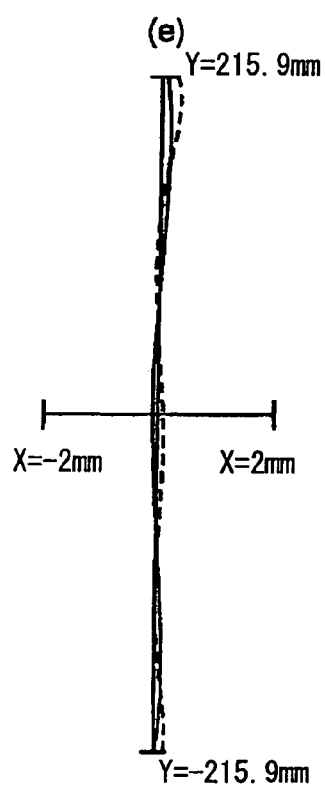

Here, when a lens in accordance with the coefficients in FIG. 28 and FIG. 29 has no refractive index distribution, the lens has focused positions with respect the main scanning direction and the sub-scanning direction shown in FIG. 30D. As shown in FIG. 30D, the focused positions of optical spots are on the positive side of the scanned surface.

Figure 31:
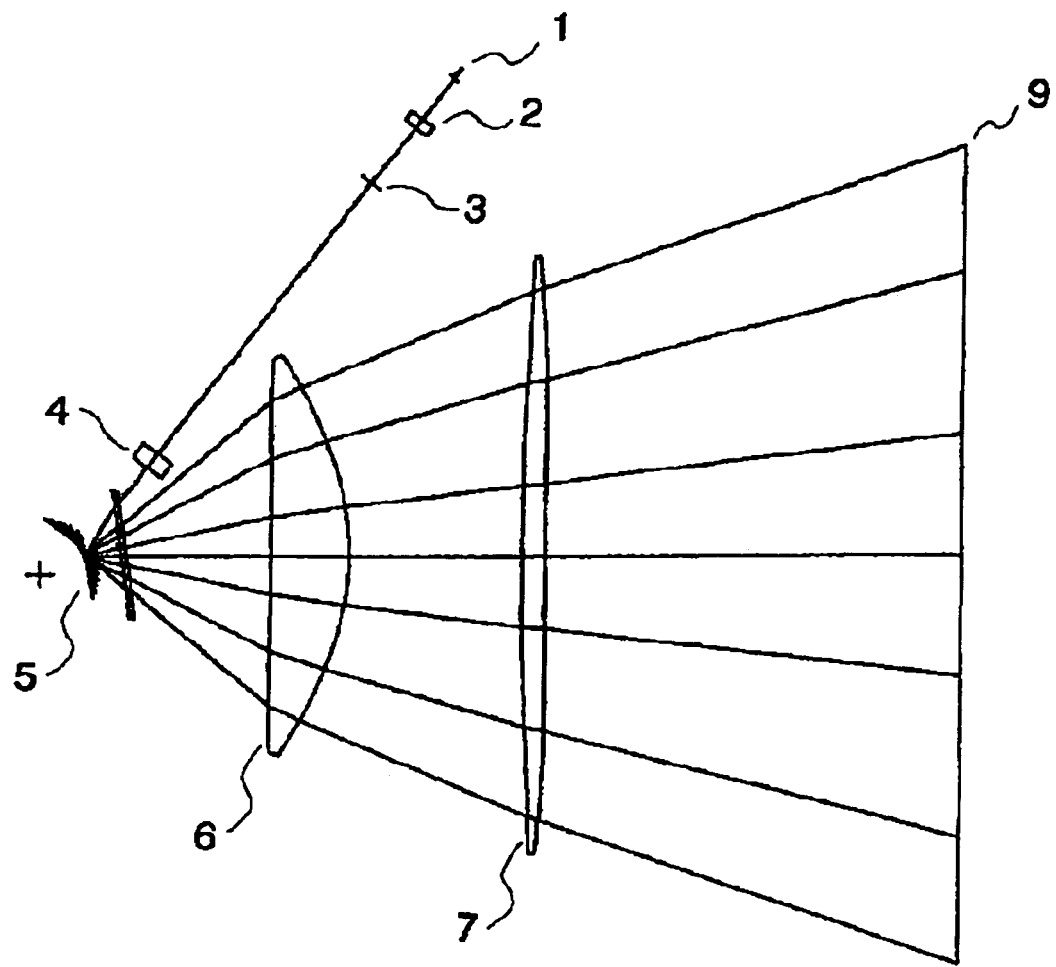
FIG. 31 is a diagram for explaining an optical scanning system including an image forming scanner lens being an optical element according to a fifth embodiment of the present invention.

A description will now be given, with reference to FIG. 31 through FIG. 40, of an optical element according to the fifth embodiment of the present invention. FIG. 31 is a diagram for explaining an optical scanner system including an image forming scanner lens being the optical element according to the fifth embodiment. FIG. 32 through FIG. 35 show coefficients of each surface of optical elements having no refractive index distribution with respect to the main scanning direction and the sub-scanning direction. FIG. 36 and FIG. 37 show coefficients of a refractive index distribution of lenses 6 and 7 having refractive index distributions. FIG. 38 and FIG. 39 show coefficients of each surface of an optical element having a refractive index distribution according to the fifth embodiment with respect to the main scanning direction and the sub-scanning direction. FIGS. 40A through 40E show focused positions of the optical elements according to the fifth embodiment with respect to the main scanning direction and the sub-scanning direction. In FIG. 31, lenses 6 and 7 are optical elements according to the fifth embodiment.

An optical scanner in FIG. 31 has components as follows.
Illuminant 1
number of beam emitting points: 4 (laser diode array)
pitch of the beam emitting points: 14 μm
wavelength: 780 nm
Coupling lens 2
focal distance: 27 mm (one illuminant by one lens)
coupling behavior: collimation
Cylindrical lens 4
focal distance with respect to the sub-scanning direction: 46.95 mm
Polygon mirror 5
number of deflection reflection surfaces: 5
radius of the inscribed circle: 18 mm
Angle between an incident beam from the illuminant side to the polygon mirror 5 and the optical axis of an image forming optical scanning system: 60°
Data of optical systems between the polygon mirror 5 and the scanned surface 9

TABLE 4

| | surface number | Rmi | Rsi (0) | X | Y | n |
|---|---|---|---|---|---|---|
| deflection reflection surface | 0 | ∞ | ∞ | 71.6 | 0.274 | |
| lens 6 | 1 | −1030.2 | −89.52 | 30 | 0 | 1.52398 |
| | 2 | −109.08 | −110.88 | 66.32 | 0 | |
| lens 7 | 3 | 1493.65 | −70.07 | 8.5 | 0 | 1.52398 |
| | 4 | 1748.58 | −28.03 | 159.35 | 0 | |

The table 4 shows the data of optical systems including the lens 6 and 7 between the polygon mirror 5 and the scanned surface 9. In the table 4, the surface number 0 is a deflection reflection surface of the polygon mirror 5, the surface number 1 is a surface of the deflection reflection surface side of the lens 6, the surface number 2 is the opposite surface of the deflection reflection surface side of the lens 6, the surface number 3 is a surface of the deflection reflection surface side of the lens 7, and the surface number 4 is the opposite surface of the deflection reflection surface side of the lens 7.

If the lenses 6 and 7 are formed of a material without a refractive index distribution such as glass under optimal design, the lenses 6 and 7 have coefficients of each surface thereof with respect to the main scanning direction and the sub-scanning direction as shown in the FIG. 32 through FIG. 35. A lens having no refractive index distribution is manufactured based on data in FIG. 32 through FIG. 35, and focused positions thereof are measured. FIG. 40A shows the focused positions of the manufactured lens having no refractive index distribution with respect to the main scanning direction and the sub-scanning direction. In FIGS. 40A through 40E, dotted curves represent the focused positions with respect to the main scanning direction, and solid curves represent the focused positions with respect to the sub-scanning direction.

Then, the lens has the ratios F(main)/W and F(sub)/W with respect to the main scanning direction and the sub-scanning direction as follows;

$$F(\text{main})/W = 0.057 \text{ mm}/323 \text{ mm} = 0.0002 \leq 0.002 \text{ and}$$

$$F(\text{sub})/W = 0.026 \text{ mm}/323 \text{ mm} = 0.00008 \leq 0.002.$$

Here, optical scanner lenses 6 and 7 are manufactured in plastic molding based on the same data in FIG. 32 through FIG. 35, and refractive index distributions thereof are measured. The lens 6 has the refractive index distribution $\delta_n$ of $2.9 \times 10^{-5}$ for the width of 4 mm, and the lens 7 has the refractive index distribution $\delta_n$ of $3.16 \times 10^{-5}$ for the width of 8 mm ($0.5 \times 10^{-6} \leq \delta_n \leq 5.0 \times 10^{-4}$). FIG. 36 and FIG. 37 show coefficients of the refractive index distributions of the lenses 6 and 7, respectively.

Also, FIG. 40B shows focused positions of the lens 6 with respect to the main scanning direction and the sub-scanning direction. The lens 6 has the ratios of F(main)/W and F(sub)/W with respect to the main scanning direction and the sub-scanning direction as follows;

$$F(\text{main})/W = 0.057 \text{ mm}/323 \text{ mm} = 0.0002 \text{ and}$$

$$F(\text{sub})/W = 1.027 \text{ mm}/323 \text{ mm} = 0.0032.$$

Namely, the ratio F(sub)/W does not meet the upper bound of 0.002.

In order to correct this misalignment of the focused positions for each image height, coefficients of the lens 6 are determined with respect to the sub-scanning direction of each surface thereof. FIG. 38 and FIG. 39 show the determined coefficients. Here, the lens 6 is noticed because the lens 6 has the largest deviation in thickness and the deviation 0.69 is greater than 0.65 in an effective range. An optical scanner lens is manufactured in plastic molding based on data in FIG. 38 and FIG. 39, and focused positions of the manufactured lens are measured with respect to the sub-scanning direction. FIG. 40C shows the focused positions with respect to the main scanning direction and the sub-scanning direction. The lens 6 has the ratios F(main)/W and F(sub)/W with respect to the main scanning direction and the sub-scanning direction as follows;

$F(\text{main})/W=0.057\ \text{mm}/323\ \text{mm}=0.0002\leq0.002$ and $F(\text{sub})/W=0.011\ \text{mm}/323\ \text{mm}=0.00003\leq0.002$.

In this case, the focused positions of the lens with respect to the sub-scanning direction are located away from the scanned surface 9 at about 1.2 mm. In order to set the focused positions on the scanned surface 9, it is necessary to shift the cylindrical lens 4 in the optical axis direction by −1.5 mm. FIG. 40E shows the resulting focused positions with respect to the main scanning direction and the sub-scanning direction. Then, the lens has a deviation of 0.045 of pitches of optical spots with respect to image heights, and the deviation thereof is less than the desirable upper bound of 0.1.

Here, if a lens having no refractive index distribution is formed under the coefficients in FIG. 38 and FIG. 39, the lens has focused positions with respect to the main scanning direction and the sub-scanning direction as shown in FIG. 40D, and the focused positions of optical spots are in the positive side of the scanned surface 9.

Figure 43A:
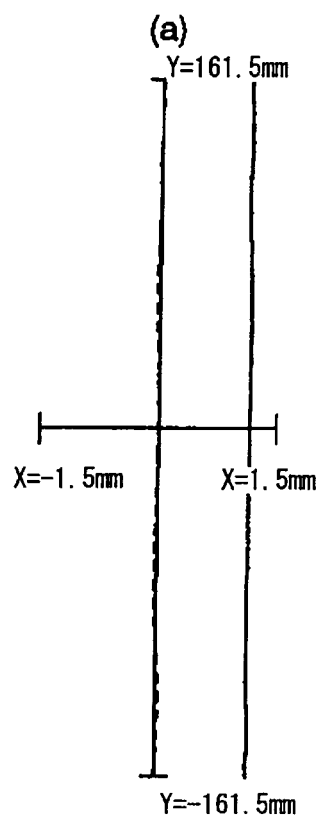
FIGS. 43A through 43C are diagrams illustrating focused positions of the optical elements according to the sixth embodiment with respect to the main scanning direction and the sub-scanning direction.

A description will now be given, with reference to FIG. 41 through FIG. 43, of an optical element according to the sixth embodiment of the present invention. FIG. 41 and FIG. 42 show coefficients of each surface of an optical element having a refractive index distribution according to the sixth embodiment with respect to the main scanning direction and the sub-scanning direction. FIGS. 43A through 43C show focused positions of the optical elements according to the sixth embodiment with respect to the main scanning direction and the sub-scanning direction.

Similarly to the fifth embodiment, the sixth embodiment handles optical scanner systems shown in FIG. 31 except that coefficients of each surface of the lens 7 with respect to the sub-scanning direction are determined to correct misalignment of the focused positions due to refractive index distributions of the lenses 6 and 7 for each image height. FIG. 41 and FIG. 42 show the determined coefficients. Here, the lens 7 is noticed because the lens 7 has the greatest power with respect to the sub-scanning direction. FIG. 43A shows focused positions of the lens 7 with respect to the main scanning direction and the sub-scanning direction. The lens 7 has the ratios F(main)/W and F(sub)/W with respect to the main scanning direction and the sub-scanning direction as follows;

$F(\text{main})/W=0.057\ \text{mm}/323\ \text{mm}=0.0002\leq0.002$ and $F(\text{sub})/W=0.011\ \text{mm}/323\ \text{mm}=0.000034\leq0.002$.

In this case, the focused positions with respect to the sub-scanning direction are located away from the scanned surface 9 at about 1.2 mm. In order to set the focused positions on the scanned surface 9, it is necessary to shift the cylindrical lens 4 in the optical axis direction by −1.5 mm. FIG. 43C shows the resulting focused positions with respect to the main scanning direction and the sub-scanning direction. In this case, the lens 7 has a deviation of 0.045 of pitches of optical spots with respect to image heights, and the deviation thereof is less than the desirable upper bound of 0.1.

Figure 43B:
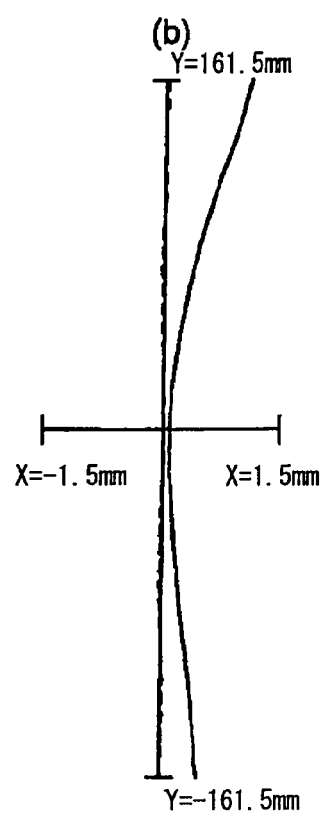
Figure 43C:
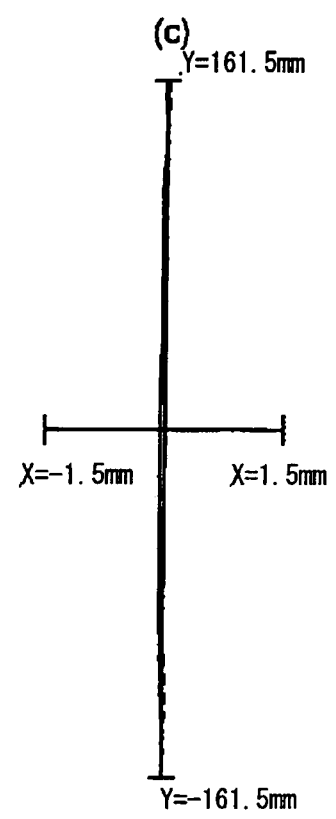

Here, if a lens having no refractive index distribution is formed under the coefficients in FIG. 41 and FIG. 42, the lens has the focused positions with respect to the main scanning direction and the sub-scanning direction as shown in FIG. 43B, and the focused positions of optical spots are in the positive side of the scanned surface 9.

A description will now be given, with reference to FIG. 44, of an image forming apparatus having an optical scanner according to the present invention and a laser printer 100 as an example thereof.

Figure 44:
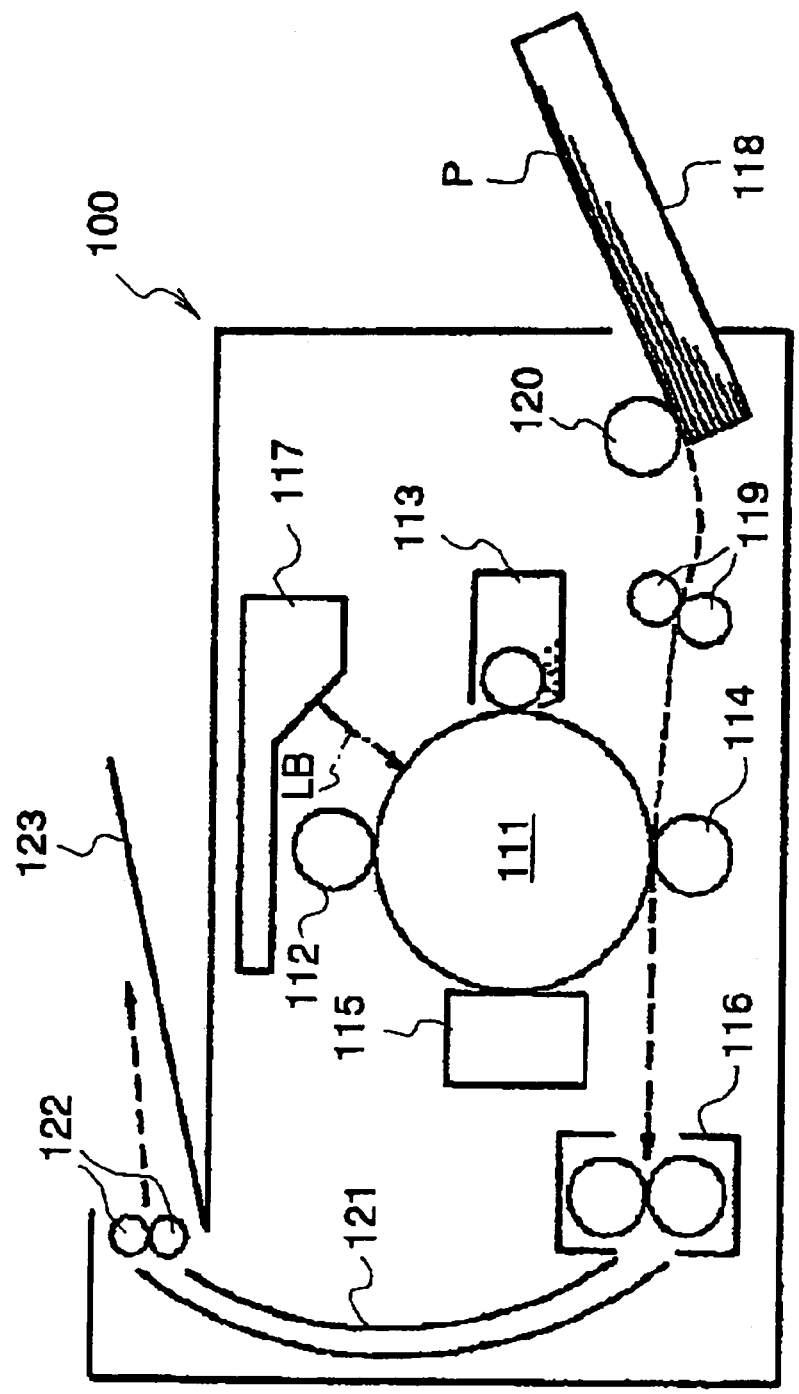
FIG. 44 is a diagram illustrating a structure of an image forming apparatus using the optical scanner according to the present invention.

As shown in FIG. 44, the laser printer 100 comprises a latent image carrier 111, a charge roller 112, a developing apparatus 113, a transferring roller 114, a cleaning apparatus 115, a fixing apparatus 116, an optical scanner 117, a paper cassette 118, a pair of resist rollers 119, a paper feeding roller 120, a carrier path 121, an output paper roller 122, and a tray 123.

The laser printer 100, which is an example of the image forming apparatus according to the present invention, has a cylindrical photoconductive photoreceptor as the latent image carrier 111. The charge roller 112, which serves as charge means, the developing apparatus 113, the transferring roller 114, and the cleaning apparatus 115 are provided near the latent image carrier 111. A corona charger may be used as the charge means. The optical scanner 117 for optically scanning an image by using a laser beam LB is provided between the charge roller 112 and the developing apparatus 113 so as to expose the image.

In image formation, the latent image carrier 111, which is a photoconductive photoreceptor, is rotated clockwise at constant velocity. The charge roller 112 charges a surface of the latent image carrier 111 uniformly. The laser beam LB of the optical scanner 117 optically writes the image, and then an electrostatic latent image is formed through exposure. The formed electrostatic latent image is in a state of a negative latent image and an image part thereof is exposed. The developing apparatus 113 inversely develops the electrostatic latent image and a toner image is formed on the latent image carrier 111.

The cassette 118 accommodating a transferred papers P is detachable from the laser printer 100. As shown in FIG. 44, the paper feeding roller 120 feeds the top sheet of the transferred papers P for the cassette 118 installed in the laser printer 100. The pair of resist rollers 119 catch the top sheet of the transferred papers P. The pair of resist rollers 119 delivers the sheet of the transferred papers P to a transfer part synchronously with shifting of a toner image on the latent image carrier 111 to a transferred position. The delivered sheet of the transferred papers P is superposed on the toner image in the transfer part and then the toner image is electrostaticly transferred on the sheet through the transfer roller 114. The transferred sheet on which the toner image is transferred is delivered to the fixing apparatus 116 so as to fix the toner image. The pair of output paper rollers 122 supply the fixed sheet in the tray 123 via the carrier path 121.

After transferring of the toner image, the cleaning apparatus 115 cleans the surface of the latent image carrier 111 so as to remove remaining toner and paper powders.

When the optical scanner 117 having the optical element according to the previous embodiments is used in the laser printer 100, it is possible to perform proper image formation. Although the laser printer is handled as the example of the image forming apparatus according to the present invention, the image forming apparatus is applicable to a digital copier, a laser facsimile and so on.

In the above-mentioned first through the sixth embodiments, an optical element is corrected by adjusting only surface shapes thereof. However, the optical element may be corrected by adjusting the thickness thereof rather than the surface shapes.

The present invention is not limited to the specifically disclosed embodiments, and variations and modifications may be made without departing from the scope of the present invention.

The present application is based on Japanese priority application No. 2002-147934 filed May 22, 2002, the contents of which are hereby incorporated by reference.

What is claimed is:

1. An optical element for focusing a plurality of optical beams deflected by an optical deflector on a scanned surface in a multi-beam optical scanner as a plurality of optical spots wherein said optical beams are emitted by a multi-beam illuminant having a plurality of beam emitting points, comprising:
a lens having a refractive index distribution,
wherein said lens, which serves as one component of an optical system in said multi-beam optical scanner, is designed to correct an optical spot pitch deviation on the scanned surface, which is defined as $1-\beta_{min}/\beta_{max}$ where $\beta_{max}$ (μm) and $\beta_{min}$ (μm) are a maximal value and a minimal value of pitches of the optical spots on the scanned surface, respectively, due to said refractive index distribution with respect to image heights.

2. The optical element as claimed in claim 1, wherein said optical spot pitch deviation with respect to the image heights is less than or equal to 0.1.

3. The optical element as claimed in claim 1, wherein said lens is formed of plastics.

4. The optical element as claimed in claim 3, wherein said refractive index distribution of the lens is more than or equal to $0.5\times10^{-6}$ in an effective range of said lens corresponding to an effective write width W (mm) scanned by each of the optical spots on the scanned surface.

5. The optical element as claimed in claim 1, wherein said optical system has at least one second optical element, and said lens has a maximal value of a lens thickness deviation, which is defined as $1-D_{min}/D_{max}$ where $D_{max}$ (mm) and $D_{min}$ (mm) are a maximal lens thickness and a minimal lens thickness, respectively, with respect to an optical axis direction for each position of a main scanning direction among lenses included in said optical system.

6. The optical element as claimed in claim 5, wherein said lens is shaped such that the lens thickness deviation is more than or equal to 0.65 in an effective range of said lens corresponding to an effective write width W (mm) scanned by each of the optical spots on the scanned surface.

7. The optical element as claimed in claim 1, wherein said optical system has at least one second optical element, and said lens has greater power with respect to a sub-scanning direction than any other optical elements included in said optical system.

8. A multi-beam optical scanner for optically scanning a scanned surface, comprising:
a multi-beam illuminant emitting a plurality of optical beams, said multi-beam illuminant having a plurality of beam emitting points;
an optical deflector deflecting said optical beams; and
an optical system focusing said deflected optical beams on the scanned surface as a plurality of optical spots,
wherein said optical system has an optical element comprising: a lens having a refractive index distribution, wherein said lens is designed to correct an optical spot pitch deviation on the scanned surface, which is defined as $1-\beta_{min}/\beta_{max}$ where $\beta_{max}$ (μm) and $\beta_{min}$ (μm) are a maximal value and a minimal value of pitches of the optical spots on the scanned surface, respectively, due to said refractive index distribution with respect to image heights.

9. An image forming apparatus for forming an image, comprising:
a photosensitive image carrier;
an optical scanning part scanning a scanned surface of said photosensitive image carrier so as to form a latent image; and
a developing part developing said latent image so as to obtain the image,
wherein said optical scanning part is a multi-beam optical scanner, comprising: a multi-beam illuminant emitting a plurality of optical beams, said multi-beam illuminant having a plurality of beam emitting points; an optical deflector deflecting said optical beams; and an optical system focusing said deflected optical beams on the scanned surface as a plurality of optical spots, wherein said optical system has an optical element comprising: a lens having a refractive index distribution, wherein said lens is designed to correct an optical spot pitch deviation on the scanned surface, which is defined as $1-\beta_{min}/\beta_{max}$ where $\beta_{max}$ (μm) and $\beta_{min}$ (μm) are a maximal value and a minimal value of pitches of the optical spots on the scanned surface, respectively, due to said refractive index distribution with respect to image heights.

10. An optical element for focusing a plurality of optical beams deflected by an optical deflector on a scanned surface in a multi-beam optical scanner as a plurality of optical spots wherein said optical beams are emitted by a multi-beam illuminant having a plurality of beam emitting points, comprising:
means, which serve as one component of an optical system in said multi-beam optical scanner, for correcting an optical spot pitch deviation on the scanned surface, which is defined as $1-\beta_{min}/\beta_{max}$ where $\beta_{max}$ (μm) and $\beta_{min}$ (μm) are a maximal value and a minimal value of pitches of the optical spots on the scanned surface, respectively, due to a refractive index distribution therein with respect to image heights.

11. The optical element as claimed in claim 10, wherein said optical spot pitch deviation with respect to the image heights is less than or equal to 0.1.

12. The optical element as claimed in claim 10, wherein said means are formed of plastics.

13. The optical element as claimed in claim 12, wherein said refractive index distribution thereof is more than or equal to $0.5\times10^{-6}$ in an effective range thereof corresponding to an effective write width W (mm) scanned by each of the optical spots on the scanned surface.

14. The optical element as claimed in claim 10, wherein said optical system has at least one second optical element, and said means achieve a larger lens thickness deviation, which is defined as $1-D_{min}/D_{max}$ where $D_{max}$ (mm) and $D_{min}$ (mm) are a maximal lens thickness and a minimal lens thickness, respectively, with respect to an optical axis direction for each position of a main scanning direction than any other optical elements included in said optical system.

15. The optical element as claimed in claim 14, wherein said means have the lens thickness deviation of more than or equal to 0.65 in an effective range thereof corresponding to an effective write width W (mm) scanned by each of the optical spots on the scanned surface.

16. The optical element as claimed in claim 10, wherein said optical system has at least one second optical element, and said means have greater power with respect to a sub-scanning direction than any other optical elements included in said optical system.

17. A multi-beam optical scanner for optically scanning a scanned surface, comprising:
    means for emitting a plurality of optical beams, said means for emitting the optical beams having a plurality of beam emitting points;
    means for deflecting said optical beams;
    means for focusing said deflected optical beams on the scanned surface as a plurality of optical spots,
    wherein said means for focusing the deflected optical beams have an optical element, comprising: means for correcting an optical spot pitch deviation on the scanned surface, which is defined as $1-\beta_{min}/\beta_{max}$ where $\beta_{max}$ (μm) and $\beta_{min}$ (μm) are a maximal value and a minimal value of pitches of the optical spots on the scanned surface, respectively, due to a refractive index distribution therein with respect to image heights.

18. An image forming apparatus for forming an image, comprising:
    means for carrying the image photosensitively;
    means for scanning a scanned surface of said means for carrying the image photosensitively so as to form a latent image; and
    means for developing said latent image so as to form the image,
    wherein said means for scanning the scanned surface are a multi-beam optical scanner, comprising: means for emitting a plurality of optical beams, said means for emitting the optical beams having a plurality of beam emitting points; means for deflecting said optical beams; means for focusing said deflected optical beams on the scanned surface as a plurality of optical spots, wherein said means for focusing the deflected optical beams have an optical element, comprising: means for correcting an optical spot pitch deviation on the scanned surface, which is defined as $1-\beta_{min}/\beta_{max}$ where $\beta_{max}$ (μm) and $\beta_{min}$ (μm) are a maximal value and a minimal value of pitches of the optical spots on the scanned surface, respectively, due to a refractive index distribution therein with respect to image heights.

* * * * *